(12) United States Patent
Song et al.

(10) Patent No.: US 11,014,342 B2
(45) Date of Patent: May 25, 2021

(54) LAMINATED FILM, AND DISPLAY DEVICE INCLUDING SAME

(71) Applicants: SAMSUNG ELECTRONICS CO., LTD., Suwon-si (KR); SAMSUNG SDI CO., LTD., Yongin-si (KR)

(72) Inventors: Sun Jin Song, Seoul (KR); Seoung Jin Seo, Suwon-si (KR); Kyeong-sik Ju, Suwon-si (KR); Jungha Chae, Yongin-si (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 13 days.

(21) Appl. No.: 16/027,870

(22) Filed: Jul. 5, 2018

(65) Prior Publication Data

US 2019/0009505 A1 Jan. 10, 2019

(30) Foreign Application Priority Data

Jul. 7, 2017 (KR) .......................... 10-2017-0086695

(51) Int. Cl.
*B32B 27/08* (2006.01)
*B32B 15/08* (2006.01)
(Continued)

(52) U.S. Cl.
CPC ................ *B32B 27/08* (2013.01); *B32B 7/00* (2013.01); *B32B 7/12* (2013.01); *B32B 15/08* (2013.01);
(Continued)

(58) Field of Classification Search
CPC ........... B32B 27/08; B32B 27/00; B32B 7/00; B32B 7/12; B32B 15/08; B32B 2457/20;
(Continued)

(56) References Cited

U.S. PATENT DOCUMENTS 5,084,526 A * 1/1992 Harris ..................... C08L 67/03
525/425
7,166,352 B2 1/2007 Watanabe et al.
(Continued)

FOREIGN PATENT DOCUMENTS

CN 1441453 A 9/2003
CN 103079816 A 5/2013
(Continued)

OTHER PUBLICATIONS

Extended European Search Report dated Mar. 22, 2019, of the corresponding European Patent Application No. 18181907.9.
(Continued)

*Primary Examiner* — Michael Zhang
(74) *Attorney, Agent, or Firm* — Cantor Colburn LLP

(57) ABSTRACT

A laminated film including a first film; and a second film disposed on the first film, wherein a tensile modulus of the second film is greater than or equal to a tensile modulus of the first film, and a transmittance of the first film is greater than or equal to a transmittance of the second film, provided that at least one of the tensile modulus of the first film and the tensile modulus of the second film are not equal or the transmittance of the first film and the transmittance of the second film are not equal.

20 Claims, 12 Drawing Sheets

(51) Int. Cl.
*G02B 1/14* (2015.01)
*B32B 7/00* (2019.01)
*B32B 27/00* (2006.01)
*B32B 7/12* (2006.01)
*C08G 73/14* (2006.01)
*G02F 1/1333* (2006.01)

(52) U.S. Cl.
CPC .............. *B32B 27/00* (2013.01); *C08G 73/14* (2013.01); *G02B 1/14* (2015.01); *G02F 1/133308* (2013.01); *B32B 2255/10* (2013.01); *B32B 2307/40* (2013.01); *B32B 2307/50* (2013.01); *B32B 2457/20* (2013.01); *G02F 1/133331* (2021.01); *G02F 2201/503* (2013.01)

(58) Field of Classification Search
CPC ............ B32B 2307/50; B32B 2307/40; B32B 2255/10; G02B 1/14; G02B 1/10; G02F 1/133308; G02F 2201/503; G02F 2001/13331; C08G 73/14; C08G 73/10; G09F 9/301
See application file for complete search history.

(56) References Cited

U.S. PATENT DOCUMENTS

| | | | |
|---|---|---|---|
| 9,189,027 B2 | 11/2015 | Lee et al. | |
| 9,259,898 B2 | 2/2016 | Hirai et al. | |
| 9,429,999 B2 | 8/2016 | Lee et al. | |
| 9,862,173 B2 | 1/2018 | Hwang et al. | |
| 10,295,818 B2 | 5/2019 | Nam et al. | |
| 10,693,024 B2 | 6/2020 | Weigel et al. | |
| 2011/0121271 A1* | 5/2011 | Jeon | H01L 51/5275 257/40 |
| 2011/0281092 A1* | 11/2011 | Ryu | B32B 7/02 428/212 |
| 2012/0003448 A1 | 1/2012 | Weigel et al. | |
| 2012/0296050 A1* | 11/2012 | Cho | C08L 79/08 525/436 |
| 2013/0203937 A1* | 8/2013 | Cho | C08G 73/14 524/600 |
| 2014/0243482 A1* | 8/2014 | Park | C08G 73/1067 525/450 |
| 2014/0356599 A1 | 12/2014 | Hongo et al. | |
| 2015/0010742 A1 | 1/2015 | Han et al. | |
| 2015/0057426 A1* | 2/2015 | Cho | C08G 73/14 528/340 |
| 2015/0057427 A1* | 2/2015 | Cho | C08G 73/14 528/340 |
| 2015/0147532 A1 | 5/2015 | Nam et al. | |
| 2016/0046103 A1* | 2/2016 | Hong | B32B 17/064 428/336 |
| 2016/0194448 A1* | 7/2016 | Song | C08G 73/1042 428/337 |
| 2017/0121460 A1 | 5/2017 | Hong et al. | |
| 2017/0190880 A1 | 7/2017 | Jo et al. | |
| 2019/0077915 A1* | 3/2019 | Yun | C08G 73/1042 |
| 2019/0255818 A1* | 8/2019 | Ueki | B29D 11/0073 |
| 2019/0293921 A1 | 9/2019 | Nam et al. | |

FOREIGN PATENT DOCUMENTS

| | | |
|---|---|---|
| CN | 104680941 A | 6/2015 |
| EP | 1339082 A1 | 8/2003 |
| EP | 1410902 A1 | 4/2004 |
| EP | 2743078 A1 | 6/2014 |
| EP | 3162837 A1 | 5/2017 |
| EP | 3187528 A1 | 7/2017 |
| JP | 2000263702 A | 9/2000 |
| JP | 4543659 B2 | 9/2010 |
| JP | 4849355 B2 | 1/2012 |
| KR | 20130081576 A | 7/2013 |
| KR | 20140142564 A | 12/2014 |
| KR | 20150004496 A | 1/2015 |
| KR | 20150021167 A | 3/2015 |
| KR | 20150034555 A | 4/2015 |
| KR | 20150061965 A | 6/2015 |
| KR | 20150087493 A | 7/2015 |

OTHER PUBLICATIONS

Extended European Search Report dated Nov. 6, 2018, of the corresponding European Patent Application No. 18181907.9.
Office Action dated Apr. 6, 2021, of the corresponding Chinese Patent Application No. 201810735882.4.

* cited by examiner

LAMINATED FILM, AND DISPLAY DEVICE INCLUDING SAME

CROSS-REFERENCE TO RELATED APPLICATION

This application claims priority to and the benefit of Korean Patent Application No. 10-2017-0086695 filed in the Korean Intellectual Property Office on Jul. 7, 2017, and all the benefits accruing therefrom under 35 U.S.C. § 119, the content of which is incorporated herein in its entirety by reference.

BACKGROUND

1. Field

A laminated film and a display device including the laminated film are disclosed.

2. Description of the Related Art

Portable display devices such as a smart phone or a tablet PC have been an object of active research because of their high performance and popularity thereof. For example, a light-weight flexible (i.e., bendable or foldable) portable display devices have been studied and commercially developed. The portable display device of a liquid crystal display or the like includes a protective window for protecting a display module such as a liquid crystal layer. Currently, most portable display devices have a window including a rigid glass substrate. However, since glass is fragile and susceptible to breakage from an exterior impact, it is easily cracked or broken when applied to a potable display device or the like. In addition, glass is rigid, so it may not be applied for a flexible display device. Therefore, attempts have been made to substitute a protective window with a plastic film in a display device.

However, it is very difficult to simultaneously satisfy the demands for good mechanical properties (such as hardness), excellent toughness, and superior optical properties in the plastic film, which are required in order for the film to be applied for the protective window in a display device. Accordingly, there remains a need for a plastic film that can simultaneously provide suitable mechanical properties, excellent toughness, and superior optical properties and thus can be applied as a protective window for the flexible display device.

SUMMARY

An embodiment provides a laminated film that satisfies good mechanical and optical properties, as well as excellent toughness.

Another embodiment provides a display device including a laminated film having improved mechanical properties and optical properties, as well as good toughness.

An embodiment provides a laminated film that includes a first film; and a second film disposed on the first film; wherein a tensile modulus of the second film is greater than or equal to a tensile modulus of the first film, and a transmittance of the first film is greater than or equal to a transmittance of the second film, provided that the at least one of the tensile modulus of the first film and the tensile modulus of the second film are not equal or the transmittance of the first film and the transmittance of the second film are not equal.

The tensile modulus of the second film may be greater than or equal to about 5 gigapascals (GPa), when measured according to an ASTM D882 standard.

The transmittance of the first film may be greater than or equal to about 89%, when measured according to an ASTM E313 standard.

The transmittance of the second film may be greater than or equal to about 88%, when measured according to an ASTM E313 standard.

The tensile modulus of the first film may be greater than or equal to about 4 GPa, when measured according to an ASTM D882 standard.

A refractive index of the second film may be greater than a refractive index of the first film.

The laminated film may further include a hard coating layer disposed on the second film on a side opposite the first film.

The laminated film may further include a back coating layer disposed on the first film on a side opposite the second film.

The laminated film may further include an adhesive layer or a hyperelastic layer disposed between the first film and the second film.

The laminated film may further include a second back coating layer disposed between the second film and the adhesive layer or the hyperelastic layer.

The laminated film may further include a primer coating layer disposed between the first film and the adhesive layer or the hyperelastic layer.

The hard coating layer may include a (meth)acrylate polymer, a polycaprolactone, a urethane-acrylate copolymer, a polyrotaxane, an epoxy resin, an organosilicon material, an inorganic hard coating material, or a combination thereof.

Each of a thickness of the first film and a thickness of the second film may independently be about 10 micrometers (μm) to about 100 μm.

A thickness of the adhesive layer or a thickness of the hyperelastic layer may be less than or equal to about 50 μm.

The second film may be a film including polyimide, a poly(amide-imide) copolymer, or a combination thereof.

The first film may be a film including a polyimide, a poly(amide-imide) copolymer, a polyamide, polyethylene terephthalate, polyethylene naphthalate, a polycarbonate, triacetyl cellulose, or a combination thereof.

The first film and the second film may each independently include a polyimide including a structural unit represented by Chemical Formula 1; or a poly(amide-imide) copolymer including the structural unit represented by Chemical Formula 1 and a structural unit represented by Chemical Formula 2:

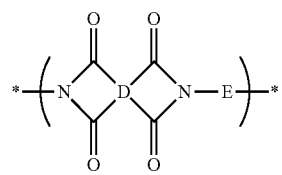

Chemical Formula 1 wherein, in Chemical Formula 1, D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 heteroaromatic ring group, wherein the aliphatic cyclic group, the aromatic ring group, or the heteroaromatic ring group is present as a single ring, a condensed ring system including two or more fused rings, or two or more moieties independently selected from the single ring and the condensed ring system that are linked by a single bond, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, —C(CF$_3$)(C$_6$H$_5$)—, or —C(=O)NH—, and wherein 1≤n≤10, 1≤p≤10, and 15≤q≤10, E is a substituted or unsubstituted C1 to C30 alkylene group, a substituted or unsubstituted C2 to C30 alkenylene group, a substituted or unsubstituted C1 to C30 alkynylene group, a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, the aliphatic cyclic group, aromatic ring group, or hetero aromatic ring group is present as a single ring, a condensed ring including two or more fused rings, or two or more ring of the single rings or the condensed rings linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, —C(CF$_3$)(C$_6$H$_5$)—, or —C(=O)NH—, and 1≤n≤10, 15≤p≤10, and 15≤q≤10, Chemical Formula 2

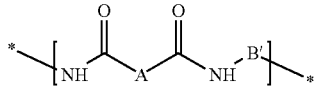

wherein, in Chemical Formula 2, each of A and B' are independently a substituted or unsubstituted C1 to C30 alkylene group, a substituted or unsubstituted C2 to C30 alkenylene group, a substituted or unsubstituted C1 to C30 alkynylene group, a substituted or unsubstituted divalent C6 to C24 aliphatic cyclic group, a substituted or unsubstituted divalent C6 to C24 aromatic ring group or a substituted or unsubstituted divalent C4 to C24 hetero aromatic ring group, wherein the aliphatic cyclic group, the aromatic ring group, or the heteroaromatic ring group is present as a single ring, a condensed ring system including two or more fused rings, or two or more moieties independently selected from a single ring and the condensed ring system that are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, —C(CF$_3$)(C$_6$H$_5$)—, or —C(=O)NH—, and wherein 1≤n≤10, 1≤p≤10, and 1≤q≤10.

The laminated film may include the polyimide or the poly(amide-imide) copolymer, wherein D of Chemical Formula 1 may be a moiety selected from chemical formulae of Formula Group 1:

Formula Group 1

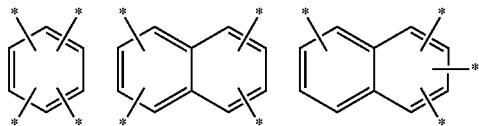

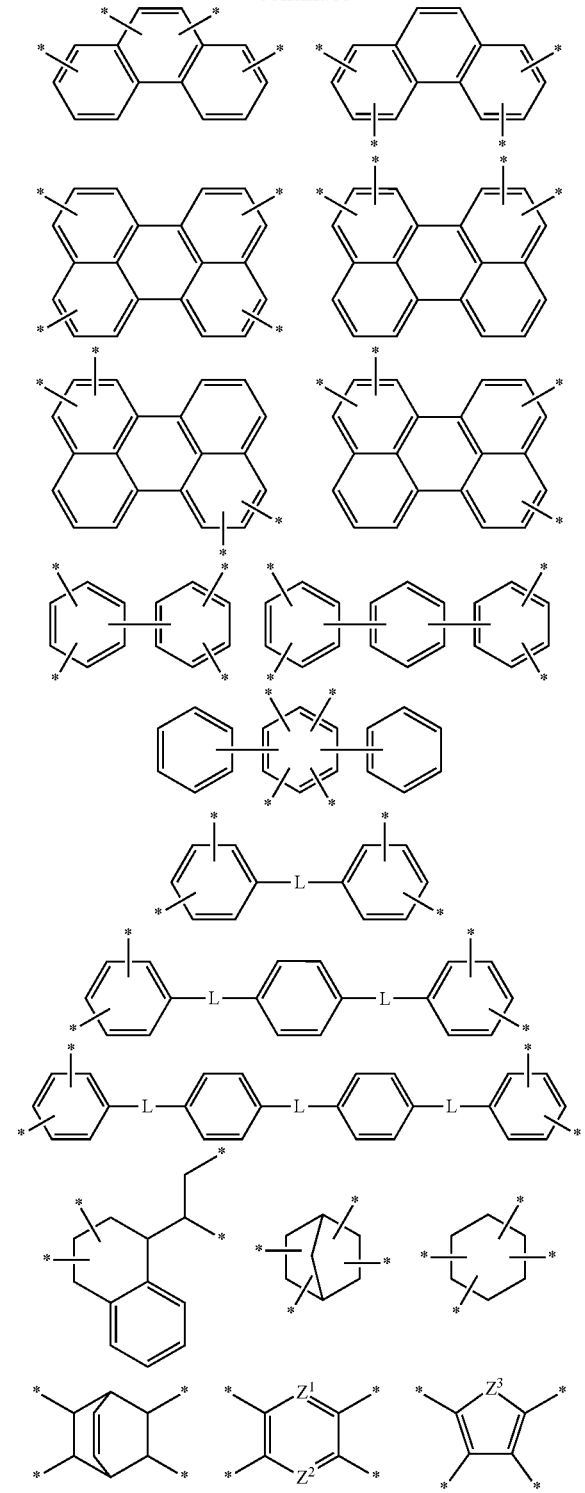

wherein, in the chemical formulae of Formula Group 1, the moiety may be substituted or unsubstituted, each L is the same or different and is independently a single bond, —O—, —S—, —C(=O)—, —CH(OH)—, —S(=O)$_2$—, —Si (CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, —C(CF$_3$)(C$_6$H$_5$)—, or —C(=O)NH—, and wherein 1≤n≤10, 1≤p≤10, and $1 \leq q \leq 10$, * is a linking portion with an adjacent atom, $Z^1$ and $Z^2$ are the same or different and are independently —N= or —C($R^{100}$)=, wherein $R^{100}$ is hydrogen or a C1 to C5 alkyl group, provided that $Z^1$ and $Z^2$ are not simultaneously —C($R^{100}$)=, and $Z^3$ is —O—, —S—, or —N$R^{101}$—, wherein $R^{101}$ is hydrogen or a C1 to C5 alkyl group.

The laminated film may include the polyimide or the poly(amide-imide) copolymer, wherein E of Chemical Formula 1 and B' of Chemical Formula 2 each may be independently a moiety represented by Chemical Formula 5 or a substituted or unsubstituted C1 to C30 alkylene group:

Chemical Formula 5

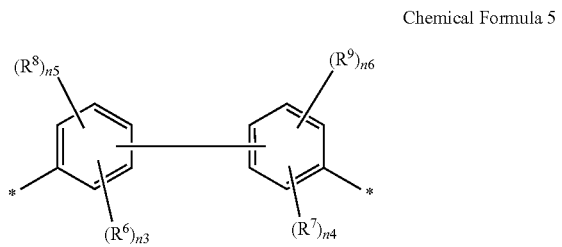

wherein, in Chemical Formula 5, each $R^6$ and $R^7$ are the same or different and are independently an electron withdrawing group selected from —$CF_3$, —$CCl_3$, —$CBr_3$, —$CO_3$, —F, —Cl, —Br, —I, —$NO_2$, —CN, —$COCH_3$, and —$CO_2C_2H_5$, each $R^8$ and $R^9$ are the same or different and are independently a halogen, a hydroxy group, an alkoxy group of formula —$OR^{204}$ wherein $R^{204}$ is a C1 to C10 aliphatic organic group, a silyl group of formula —$SiR^{205}R^{206}R^{207}$ wherein $R^{205}$, $R^{206}$, and $R^{207}$ are the same or different and are independently hydrogen or a C1 to C10 aliphatic organic group, a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of less than or equal to 4, and n4 is an integer ranging from 1 to 4, n6 is an integer ranging from 0 to 3, provided that n4+n6 is an integer of less than or equal to 4.

The laminated film may include the polyimide or the poly(amide-imide) copolymer, wherein A of Chemical Formula 2 may be a moiety selected from chemical formulae of Formula Group 3 or a substituted or unsubstituted C1 to C30 alkylene group:

Group 3

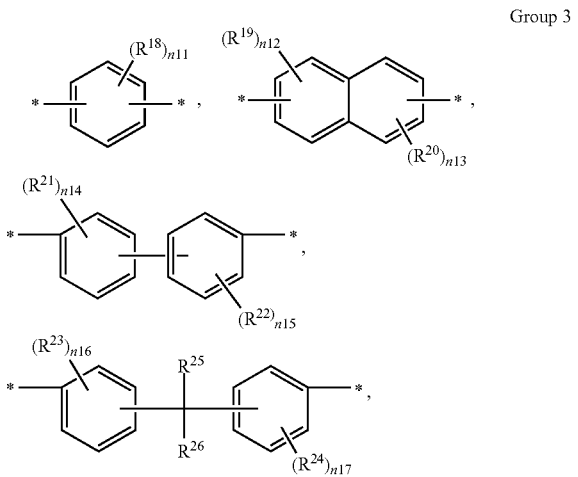

-continued

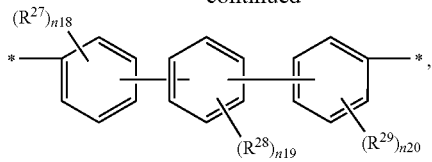

wherein, in the chemical formulae of Formula Group 3, each $R^{18}$ to $R^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, and n12 and n13 are independently an integer ranging from 0 to 3.

Another embodiment provides a display device including the laminated film.

The laminated film may be disposed on a front surface of a display panel of a display device, wherein the first film of the laminated film is disposed closer to the front surface of the display panel of the display device than the second film of the laminated film.

The laminated film according to an embodiment satisfies high mechanical properties and optical characteristic, and particularly excellent toughness, and thereby may be used as a window of a flexible display device.

DETAILED DESCRIPTION

Figure 1:
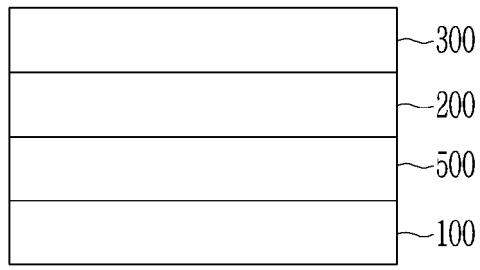
FIG. 1 is a schematic view showing a cross-sectional surface of a laminated film formed for simulating optical characteristics and mechanical properties of the laminated film according to an embodiment.

Hereinafter, exemplary embodiments are described in detail, and may be realized by those who have common knowledge in the related art. However, these embodiments are exemplary, and the present disclosure is not limited thereto. This disclosure may, however, be embodied in many different forms and is not to be construed as limited to the exemplary embodiments set forth herein.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when specific definition is not otherwise provided, the term "substituted" refers to replacement or substitution of at least one hydrogen of a given functional group or moiety by a substituent selected from a halogen atom (F, Cl, Br, or I), a hydroxy group, a nitro group, a cyano group, an amino group (such as $-NH_2$, $-NH(R^{100})$, or $-N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxyl group, an ester group, an acyl group, a substituted or unsubstituted alkyl group, a substituted or unsubstituted alicyclic organic group (e.g., cycloalkyl group, or the like), a substituted or unsubstituted aryl group (e.g., benzyl group, naphthyl group, fluorenyl group, or the like), a substituted or unsubstituted alkenyl group, a substituted or unsubstituted alkynyl group, a substituted or unsubstituted heteroaryl group, and a substituted or unsubstituted heterocyclic group, or the substituents may be linked with each other to form a ring.

As used herein, when specific definition is not otherwise provided, the term "alkyl group" refers to a C1 to C30 alkyl group, for example a C1 to C15 alkyl group; the term "cycloalkyl group" refers to a C3 to C30 cycloalkyl group, for example a C3 to C18 cycloalkyl group; the term "alkoxy group" refers to a C1 to C30 alkoxy group, for example a C1 to C18 alkoxy group; the term "ester group" refers to a C2 to C30 ester group, for example a C2 to C18 ester group; the term "acyl group" refers to a C2 to C30 acyl group, for example a C2 to C18 acyl group; the term "aryl group" refers to a C6 to C30 aryl group, for example a C6 to C18 aryl group; the term "alkenyl group" refers to a C2 to C30 alkenyl group, for example a C2 to C18 alkenyl group; the term "alkynyl group" refers to a C2 to C30 alkynyl group, for example a C2 to C18 alkynyl group; the term "alkylene group" refers to a C1 to C30 alkylene group, for example a C1 to C18 alkylene group; and the term "arylene group" refers to a C6 to C30 arylene group, for example a C6 to C16 arylene group.

As used herein, when specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example, a C1 to C15 alkyl group, a C2 to C15 alkenyl group, a C2 to C15 alkynyl group, a C1 to C15 alkylene group, a C2 to C15 alkenylene group, or a C2 to C15 alkynylene group; the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example, a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group; the term "aromatic organic group" refers to a single aromatic ring, a condensed ring system including two or more aromatic rings, or two or more aromatic rings linked by a single bond, a fluorenylene group, —O—, —S—, C—(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O) NH—, or a combination thereof, for example, —S(=O)$_2$—, a C6 to C30 group, or a combination thereof, for example, a C6 to C30 aryl group or a C6 to C30 arylene group, for example, a C6 to C16 aryl group or a C6 to C16 arylene group such as phenylene group; the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example, a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof in one ring.

As used herein, when specific definition is not otherwise provided, the term "acyl group" refers to "alkyl-C(=O)—", wherein the term "alkyl" has the same meaning as described above.

As used herein, when specific definition is not otherwise provided, the term "ester group" refers to "alkyl-C(=O)—O—" or "aryl-C(=O)—O—", wherein the terms "alkyl" and "aryl" have the same meaning as described above.

As used herein, when specific definition is not otherwise provided, the terms "alkylene group", "alkenylene group", "alkynylene group", "cycloalkylene group", cycloalkenylene group", cycloalkynylene group", "arylene group", and "heteroarylene group" refer to a divalent group respectively derived from an alkyl group, a cycloalkyl group, an aryl group, and a heteroaryl group as defined above.

As used herein, the term "polyimide" refers to "polyimide", "polyamic acid" and a combination thereof as well as "polyimide" itself. The terms "polyimide" and "polyamic acid" may be used to have the same meanings.

As used herein, "(meth)acrylate group" refers to an acrylate group and a methacrylate group.

As used herein, when specific definition is not otherwise provided, the term "combination" refers to mixing or copolymerization. Herein, "copolymerization" refers to a random copolymerization, a block copolymerization, or a graft copolymerization.

In addition, in the specification, the mark "*" may refer to a point of attachment to another atom, for example a point of attachment to nitrogen, carbon, or another atom.

An exemplary embodiment provides a laminated film that may be used as a cover window protecting a display device such as a flexible display device or a foldable display device.

A glass substrate has been commonly used for protecting the display device, but when requiring flexible and foldable characteristics of freely bending a shape, it is necessary to use a plastic material having high toughness, with hardness and strength enough to be applied in a window for a display device, and also having light transmittance, color, or the like, that are similar to those of the glass substrate. In particular, in a case of a window for a foldable display having a low flexural radius of less than or equal to about 3 mm, it requires high flexural property with good optical characteristics and high hardness. In order to provide a high flexural property, a material having a wide elastic region such as a hyperelastic material is desirable, but the material hardly satisfies window characteristics in a view of hardness. Alternatively, a thin film is suitable to satisfy the high toughness, but the thin film may deteriorate hardness while improving the optical characteristics. Accordingly, there is a continued need to develop a film for a flexible or foldable display window, while simultaneously satisfying the properties such as high toughness, good optical properties, and a high hardness. However, the high toughness, the high hardness, and the good optical characteristics can have trade-off relationships to each other, so it can be difficult to simultaneously satisfy these properties.

Accordingly, the present inventors have found that a laminated film that includes at least two different films satisfying certain conditions, and that are laminated in a certain configuration, may simultaneously satisfy the high toughness, the high hardness, and good optical characteristics, which are in trade-off relationships, so as to provide a laminated film that may be used as a cover window protecting a display device such as a flexible display device or a foldable display device. In other words, an exemplary embodiment provides a laminated film including a first film disposed on a front surface of a display panel of a display device and a second film disposed on the first film, wherein a tensile modulus of the second film is greater than or equal to a tensile modulus of the first film, a transmittance of the first film is greater than or equal to a transmittance of the second film, provided that at least one of the tensile modulus of the first film and the tensile modulus of the second film are not equal, or the transmittance of the first film and the transmittance of the second film are not equal.

In order to provide a foldable display having a flexural radius of less than or equal to about 5 millimeters (mm), for example, less than or equal to about 3 mm, for example, less than or equal to about 1 mm with a high toughness, according to an embodiment, a laminated film is obtained by attaching and laminating two thin films which pass a toughness test of less than or equal to about 5 mm, for example, less than or equal to about 3 mm, for example, less than or equal to about 1 mm in a sandwich structure using a PSA (Pressure Sensitive Adhesive), wherein an upper film (e.g., second film) to be disposed on, for example laminated on, a lower film (e.g., first film) has the same or greater hardness and/or tensile modulus than that of the lower film which is to be disposed on a front surface of a display panel of a display device, and the lower film having better than or at least the same optical characteristics as the upper film is disposed in the lower end on the front surface of a display panel.

The structure of the laminated film is provided considering the below: the upper end of the window is required to have a higher surface hardness in a view of the general functions of a window to protect a display panel of a display device; and as the hard coating layer which is generally disposed on the upper end of the window has excellent optical characteristics enough to improve the optical characteristics of the window, a lower film may have optical characteristics better than or at least same as the upper film. Without being bound by theory, this expectation is derived from the simulation results of transmittance changes of a laminated film that has a first film, a second film, and a hard coating layer that is disposed on the second film, where the refractive index of a first film to be disposed on a front surface of a display panel of a display device and the refractive index of a second film to be disposed on the first film are varied; and the simulation results of measuring the maximum strain of each of the first film, the second film, and the hard coating layer in the laminated film when impacting the laminated film, where the tensile modulus of the first film and the tensile modulus of the second film are varied. This will be described in greater detail with reference to the drawings.

FIG. 1 is a schematic cross-sectional view showing a laminated film formed for the simulation. As shown in FIG. 1, the laminated film includes a first film 100 at a lower part and a second film 200 at an upper part; and a hard coating layer 300 is present on the second film 200, and an adhesive layer 500 is present between the first film and the second film.

Figure 2:
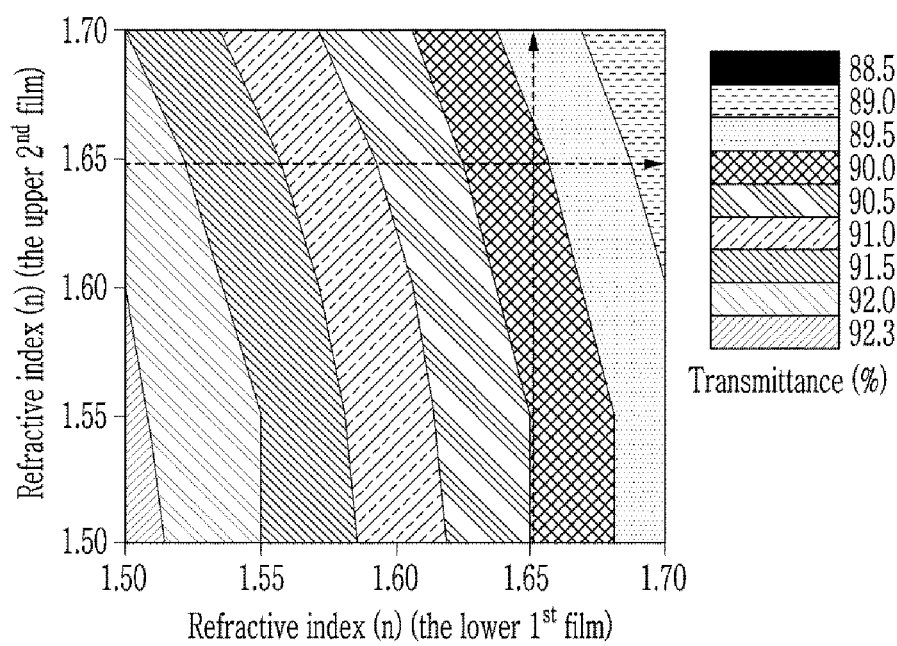
FIG. 2 is a graph of refractive index (n, for the second film) versus the refractive index (n, for the first film) showing the results of simulating a transmittance of the laminated film while changing each refractive index of a first film 100 and a second film 200 but fixing refractive indexes of the hard coating layer 300 and the adhesive layer 500 according to an embodiment, wherein the inset legend indicates the transmittance (%)

FIG. 2 shows a graph showing the results of simulating a transmittance of the whole laminated film, while fixing the refractive index of the hard coating layer 300 and adhesive layer 500 at about 1.5 and changing each refractive index of the first film 100 and the second film 200.

As shown in FIG. 2, the transmittance of the whole laminated film is influenced more by the transmittance of the lower first film than the transmittance of upper second film. In other words, the transmittance of the whole laminated film is going higher as the refractive index of the lower first film is lower, and the transmittance of the laminated film is going lower as the transmittance of the lower first film is higher. The results are corresponded to the following observations: in a case that the hard coating layer having a refractive index of about 1.5 is formed on one sheet of a polyimide film (i.e., the second film) having a refractive index of about 1.7, the transmittance of the laminated film is about 89.2%; on the other hand, in a laminated film that has an adhesive layer having a refractive index of about 1.5 formed under the polyimide film (i.e., the second film) coated with the hard coating layer as above, and a polyimide film (i.e., the first film) having a refractive index of about 1.65 is further laminated to the second film through the adhesive layer, the transmittance of the laminated film is increased up to about 89.9%. In other words, the whole transmittance of a laminated film that includes a lower film having a lower refractive index than the upper film may be improved, comparing the case consisted of one sheet of film having the same refractive index as the upper film.

Figure 3:
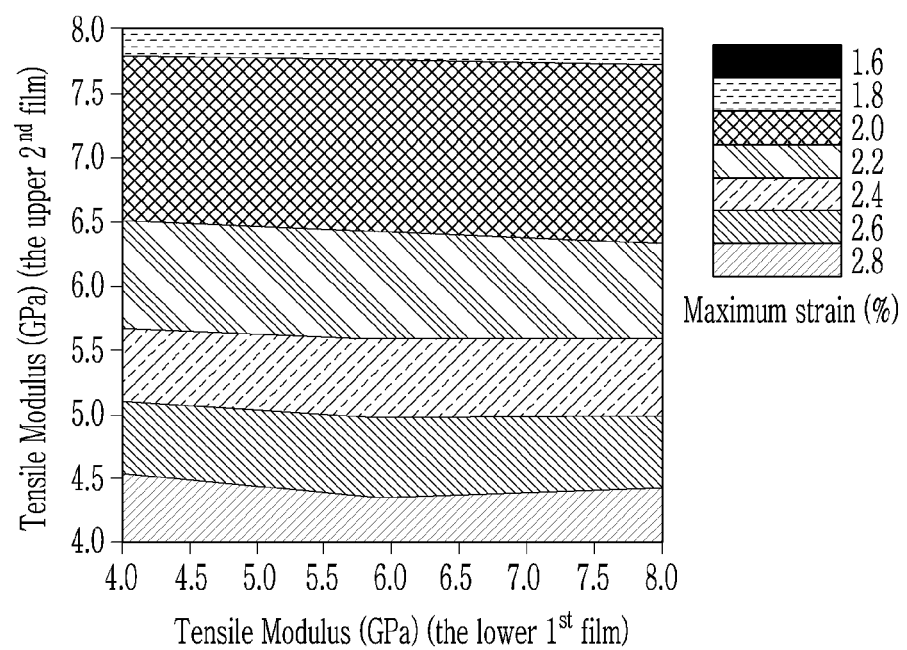
FIGS. 3 to 5 are graphs of elastic modulus (GPa, for the second film) versus elastic modulus (GPa, for the first film) with inset legends showing a maximum strain (%) of a second film 200 (FIG. 3); a maximum strain (%) of a first film 100 (FIG. 4); and a maximum strain (%) of a hard coating layer 300 (FIG. 5), respectively, when the laminated film shown in FIG. 1 is impacted through a ball drop test from an upper part of a hard-coated laminated film while changing each modulus of the first film 100 and the second film 200.
Figure 4:
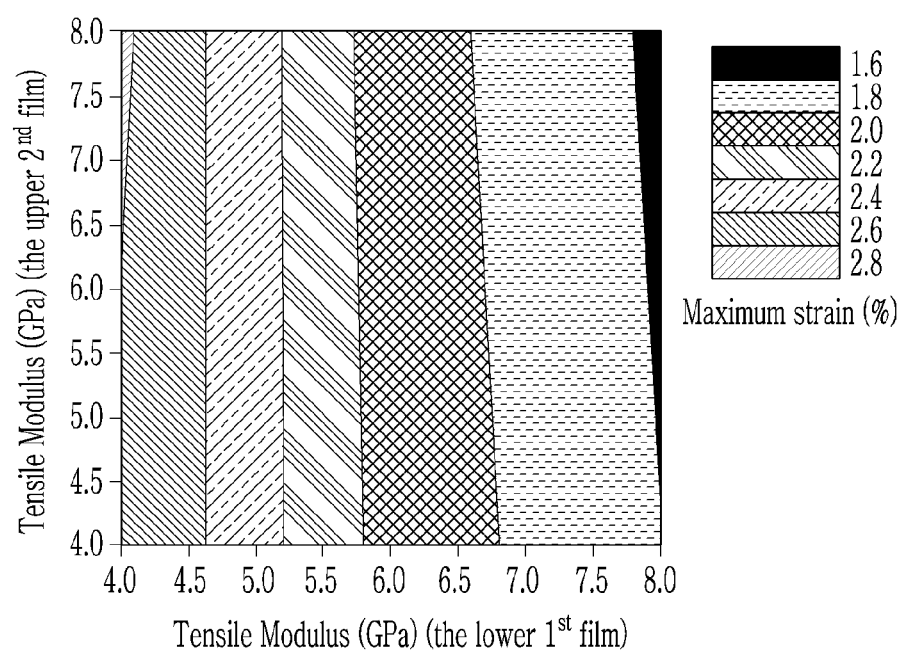
Figure 5:
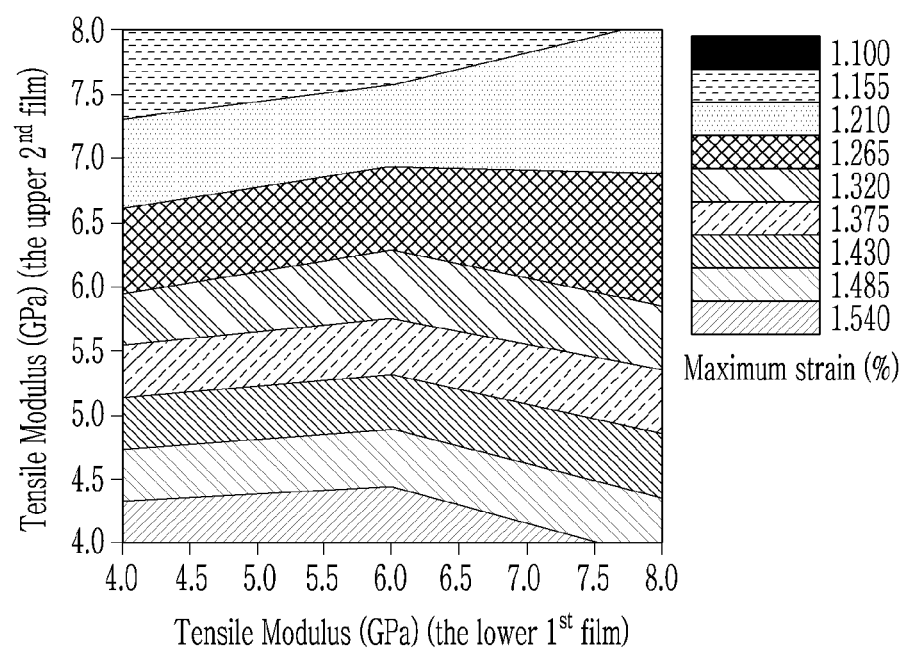

FIG. 3 to FIG. 5 are graphs showing a maximum strain (%) of the upper second film 200 (FIG. 3), a maximum strain (%) of the lower first film 100 (FIG. 4), and a maximum strain (%) of the hard coating layer 300 (FIG. 5) disposed on the upper second film, respectively, when the laminated film shown in FIG. 1 is impacted by a ball drop test in a predetermined height onto the upper end of the hard-coated laminated film while changing each elastic modulus of the lower first film 100 and the upper second film 200.

As shown in FIG. 3, it is understood that a maximum strain of the upper second film 200 is mainly influenced by an elastic modulus of the upper second film 200. As the elastic modulus of the upper second film 200 is higher, the maximum strain of the upper second film 200 is less.

FIG. 4 shows a maximum strain change of the lower first film 100, wherein the maximum strain of the lower first film 100 is mainly influenced by an elastic modulus of the lower first film 100. As the elastic modulus of the lower first film is higher, the maximum strain of the lower first film 100 is less.

FIG. 5 shows a maximum strain change of the upper hard coating layer 300. As shown in FIG. 5, it is understood that the deformation of the upper hard coating layer 300 is mainly influenced by an elastic modulus of the upper second film 200. As the modulus of the upper second film 200 is higher, the maximum strain of the hard coating layer 300 is less.

Meanwhile, comparing the maximum strain with respect to the impact of each film layer shown in FIGS. 3 to 5, it is understood that the maximum strain of the upper second film 200 is the highest, and the maximum strain of the upper hard coating layer 300 is the lowest, when applying the same impact force. However, the hard coating layer generally has unfavorable recovery, furthermore, it is important to minimize the deformation of the uppermost portions of the window, for example, the hard coating layer or the second film at the upper part, considering the characteristics of the window for a display device. Accordingly, the laminated film may be disposed to provide the upper second film with much higher modulus in order to reduce the maximum strain of the hard coating layer and the maximum strain of the second film.

From the simulation results, it is confirmed that the laminated film according to an embodiment that two different kinds of thin films, for example, two films having at least one of different modulus and transmittance are laminated, wherein a lower film to be disposed on a front surface of a display panel of a display device has a transmittance greater than or equal to a transmittance of an upper film to be disposed thereon, and the upper film has an elastic modulus greater than or equal to that of the lower film, has better toughness than one sheet of film having a thickness that is equal to or greater than a sum thickness of the two films, and also insignificantly deteriorates characteristics such as optical characteristics and mechanical properties compared to one sheet of film.

Hereinafter, referring to FIGS. 6 to 9, the various aspects of laminated film according to one or more embodiments are described in detail.

Figure 6:
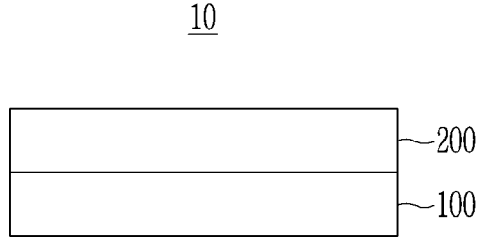
FIG. 6 is a schematic view showing a cross-section of a laminated film 10 according to an embodiment obtained by laminating a first film 100 and a second film 200.

FIG. 6 is a schematic view showing a cross-sectional surface of the laminated film 10 according to an exemplary embodiment. In FIG. 6, the laminated film 10 includes a first film 100 disposed on a front surface of a display panel of a display device (which is not shown) and a second film 200 disposed on the first film 100, and an elastic modulus of the second film 200 is higher than or equal to an elastic modulus of the first film 100. In addition, a transmittance of the first film 100 disposed on the front surface of the display panel is higher than or equal to a transmittance of the second film 200, wherein the first film 100 and the second film 200 are different in at least one of the elastic modulus and transmittance.

In an exemplary embodiment, the tensile modulus of the second film 200 may be greater than or equal to about 5 GPa, and the transmittance of the first film 100 may be greater than or equal to about 89%.

When the second film 200 has the disclosed range of elastic modulus, and the first film 100 has the disclosed range of transmittance, a window film 10 in which the first film 100 having a modulus less than or equal to that of the second film 200, and the second film 200 having a transmittance lower than or equal to that of the first film 100, are sequentially laminated in the specified order may significantly improve toughness while not significantly deteriorating the light transmittance and the hardness of the first film 100 and the second film 200.

Then, as demonstrated further in the Examples below, when the window film including one of either the first film 100 or the second film 200 is performed with a toughness test which is folded or unfolded for 200,000 times in a flexure radius of less than or equal to about 5 mm, for example, less than or equal to about 1 mm, both two films fail to pass the toughness test; on the other hand, the window film 10 in which the first film 100 and the second film 200 are laminated as shown in FIG. 1 passes the toughness test.

In an exemplary embodiment, the second film 200 may have a tensile modulus of greater than or equal to about 4 GPa.

In another exemplary embodiment, the first film 100 may have a transmittance of greater than or equal to about 88%.

When the first film 100 and the second film 200 have the disclosed ranges of elastic modulus and light transmittance, the window film 10 laminated as in above may have a transmittance of greater than or equal to about 88% and an elastic modulus of greater than or equal to at least about 4 GPa and may pass a toughness test of greater than or equal to about 100,000 times, for example, greater than or equal to about 150,000 times, for example, greater than or equal to about 200,000 times with a flexural radius of less than or equal to about 5 mm, for example, a flexural radius of less than or equal to about 1 mm.

The first film and the second film each may have independently a thickness of about 10 micrometers (μm) to about 100 μm, for example, about 10 μm to about 80 μm, for example, about 10 μm to about 50 μm, for example, about 25 μm to about 50 μm, but is not limited thereto.

Meanwhile, the terms the "display panel of display device which is not shown" mean a display panel of any suitable display device. For example, the display device may be a portable display device, for example, a display panel for a mobile phone, a portable personal computer, for example, one that the display panel is flexible or foldable.

Figure 7:
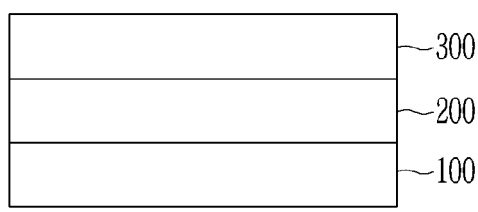
FIG. 7 is a schematic view showing a cross-section of a laminated film 20 according to another embodiment obtained by further laminating a hard coating layer 300 on the second film 200.

Then referring to FIG. 7, a laminated film 20 according to another exemplary embodiment is described.

As shown in FIG. 7, the laminated film 20 shown in FIG. 7 includes a first film 100 disposed on a front surface of a display panel of a display device which is not shown, a second film disposed on the first film 100, and a hard coating layer 300 disposed on the second film 200. That is, the laminated film 20 shown in FIG. 7 further includes a hard coating layer 300 on the second film 200, which is different from the laminated film 10 shown in FIG. 6.

When the laminated film according to an embodiment is employed in a window film or the like, adding a hard coating layer on the uppermost of the window film in order to protect the window film is known by an ordinary skilled person in the art. The hard coating layer 300 is shown as a mono-layer in FIG. 7, but the hard coating layer may have a multi-layer structure of two or more layers. The hard coating layer may enhance a surface hardness of the window film. In an embodiment, when a glass plate is used as a test plate, the hard coating layer may have a hardness of greater than or equal to 4H when measuring at a vertical load of 1 kg according to ASTM D3363. A material for the hard coating layer 300, which is a hard coating material, may include any suitable hard coating material, including those known in the art, and is not particularly limited. For example, the hard coating material may be a material cured by heat or light. Examples of the material may be an (meth)acrylate polymer, a polycaprolactone, a urethane-(meth)acrylate copolymer, a polyrotaxane, an epoxy resin, an organosilicon material such as silsesquioxane, and the like, an inorganic hard coating material such as silica, and the like, but are not limited thereto. Examples of the (meth)acrylate polymer may be a polymer of monomer mixtures including a multi-functional (meth)acrylate monomer. Examples of the multi-functional (meth)acrylate monomer may be trimethylolpropane triacrylate (TMPTA), trimethylolpropaneethoxy triacrylate (TMPEOTA), glycerine propoxylated triacrylate (GPTA), pentaerythritol tetraacrylate (PETA), and dipentaerythritol hexaacrylate (DPHA), but are not limited thereto. The urethane-(meth)acrylate material and multi-functional (meth)acrylate material may have improved adherence and high productivity.

A thickness of the hard coating layer 300 may be less than or equal to about 50 μm, for example about 5 μm to about 30 μm, for example about 5 μm to about 20 μm, but is not limited thereto.

Other structures besides the hard coating layer 300 in FIG. 7, which are the first film 100 and the second film 200, are the same as in FIG. 6, so the descriptions are omitted here.

Figure 8:
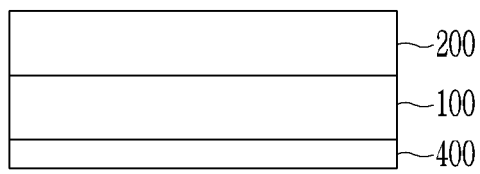
FIG. 8 is a schematic view showing a cross-section of a laminated film 30 according to another embodiment obtained by further laminating a back coating layer 400 under the first film 100.

Then, referring to FIG. 8, a laminated film 30 according to an exemplary embodiment is described.

As shown in FIG. 8, the laminated film 30 shown in FIG. 8 includes a first film 100 disposed on a front surface of a display panel of a display device which is not shown, a second film disposed on first film 100, and a back coating layer 400 disposed under the first film 100. That is, the laminated film 30 shown in FIG. 8 further includes a back coating layer 400 under the first film 100, which is different from the laminated film 10 shown in FIG. 6.

The back coating layer 400 may be colorless or transparent, or may control a color coordinate of the laminated film by adding a dye into a colorless, transparent medium. The back coating layer 400 may include any suitable material capable of being well attached to an adhesive layer or a hyperelastic layer disposed on the lower part and also maintaining toughness. For example, the back coating layer 400 may include the same material as the hard coating layer, and may include any suitable materials used for the hard coating layer for a window for a display device without limitations. For example, the back coating layer 400 may include a (meth)acrylate-based polymer, polycaprolactone, a urethane-(meth)acrylate copolymer, a polyrotaxane, an epoxy resin, an organosilicon material such as a siloxane copolymer, perfluoropolyether, or a combination thereof.

A thickness of the back coating layer 400 may be about 30 (nanometers) nm to about 300 nm, for example, about 40 nm to about 200 nm, for example, about 50 nm to about 180 nm, for example, about 60 nm to about 150 nm, for example, about 70 nm to about 130 nm, for example, about 80 nm to about 120 nm, for example, about 90 nm to about 120 nm, and the back coating layer 400 may be formed in a relatively thinner thickness than the hard coating layer 300.

A refractive index of the back coating layer 400 may be less than or equal to about 1.7, for example, less than or equal to about 1.6, for example, less than or equal to about 1.5, for example less than or equal to about 1.4, for example, less than or equal to about 1.3.

The other layers besides the back coating layer 400 in FIG. 8 are the same as in above, so the descriptions are omitted here.

Figure 9:
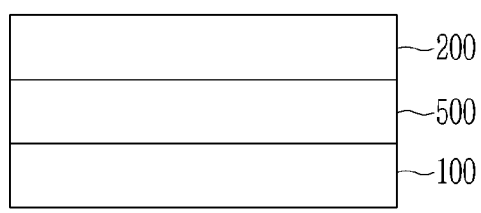
FIG. 9 is a schematic view showing a cross-section of a laminated film 40 according to an embodiment including an adhesive layer or a hyperelastic layer 500 between the first film 100 and the second film 200.

FIG. 9 is a schematic view showing a cross-sectional surface of the laminated film 40 including a first film 100 disposed on a front surface of a display panel of a display device which is not shown, a second film 200 disposed on the first film 100, and an adhesive layer or a hyperelastic layer 500 interposed between the first film 100 and the second film 200.

The adhesive layer may include a PSA adhesive, and the hyperelastic layer may include a hyperelastic material such as a polyurethane or a polydimethyl siloxane (PDMS), but is not limited thereto.

By including the adhesive layer or the hyperelastic layer 500, the first film 100 and the second film 200 may be more stably fixed and attached, and the film may be stably recovered even if the film is deformed during the bending. But the adhesive layer or the hyperelastic layer 500 may cause deteriorating optical characteristics and hardness, so the adhesive layer or the hyperelastic layer 500 may have a thinner thickness. Alternatively, a polyurethane layer having a high modulus may be used as the adhesive layer or the hyperelastic layer 500.

A thickness of the adhesive layer or the hyperelastic layer 500 may be less than or equal to about 50 μm, for example, about 10 μm to about 40 μm, for example, about 10 μm to about 30 μm, but is not limited thereto.

Other components besides the adhesive layer or the hyperelastic layer 500 in FIG. 9, which are the first film 100 and the second film 200, are the same as in FIG. 6, so the descriptions thereof are omitted here.

Figure 10:
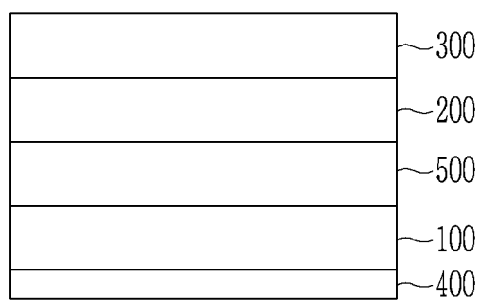
FIG. 10 is a schematic view showing a cross-section of a laminated film 50 according to an embodiment including a first film 100 and a second film 200, a hard coating layer 300 disposed on the second film 200, a back coating layer 400 under the first film 100, and an adhesive layer or a hyperelastic layer 500 between the first film 100 and the second film 200.

FIG. 10 schematically shows a cross-sectional surface of the laminated film 50 according to another exemplary embodiment.

Referring to FIG. 10, the laminated film 50 includes a first film 100 disposed on a front surface of the display panel of a display device which is not shown, a second film 200 disposed on first film 100, a hard coating layer 300 disposed on the second film 200, a back coating layer 400 disposed under the first film 100, and an adhesive layer or a hyperelastic layer 500 interposed between the first film 100 and the second film 200.

In FIG. 10, the first film 100 and the second film 200 are the same as in FIG. 6; the hard coating layer 300 is the same as in FIG. 7; the back coating layer 400 is the same as in FIG. 8; and the adhesive layer or the hyperelastic layer 500 is the same as in FIG. 9, so the detailed descriptions of each components are omitted here.

Figure 11:
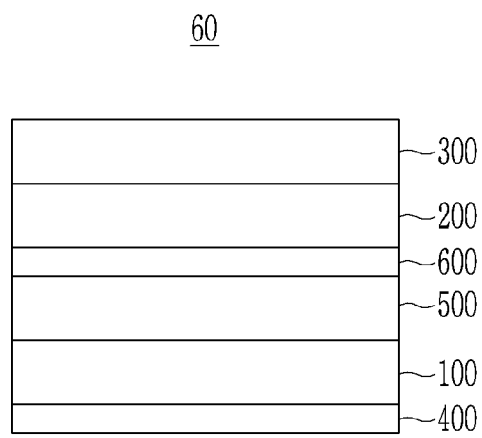
FIG. 11 is a schematic view showing a cross-section of a laminated film 60 according to an embodiment including a first film 100 and a second film 200, a hard coating layer 300 disposed on the second film 200, a back coating layer 400 under the first film 100, and an adhesive layer or a hyperelastic layer 500 between the first film 100 and the second film 200, and a second back coating layer 600 between the second film 200 and the adhesive layer or hyperelastic layer 500.

FIG. 11 schematically shows a cross-sectional surface of the laminated film 60 according to an exemplary embodiment.

Referring to FIG. 11, the laminated film 60 according to an exemplary embodiment includes a first film 100 disposed on a front surface of the display panel of a display device which is not shown, a second film 200 disposed on first film 100, a hard coating layer 300 disposed on the second film 200, a back coating layer 400 disposed under the first film 100, and an adhesive layer or a hyperelastic layer 500 interposed between the first film 100 and the second film 200, and further includes a second back coating layer 600 interposed between the second film 200 and the adhesive layer or hyperelastic layer 500.

The second back coating layer 600 is the same as the back coating layer 400 disposed under the first film 100 shown in FIG. 8, except being disposed between the second film 200 and the adhesive layer or the hyperelastic layer 500. As described about the back coating layer 400 in FIG. 8, the second back coating layer 600 is also used as colorless or transparent or used by adding a dye in a colorless or transparent medium for controlling the color coordinate of the laminated film. When the adhesive layer or the hyperelastic layer 500 is interposed between first film 100 and the second film 200, the optical characteristics of the laminated film may be deteriorated by the adhesive layer or the hyperelastic layer 500, so in order to minimize or eliminate the deterioration, the second back coating layer 600 may be disposed between the second film 200 and the adhesive layer or the hyperelastic layer 500.

A material, a thickness, and a refractive index of the second back coating layer 600 in FIG. 11 are the same as in the back coating layer 400 shown in FIG. 8, so the details thereof are omitted here. The ordinary skilled person in the art may select an appropriate material considering a desirable usage or required optical characteristics of the laminated film, and the like.

Figure 12:
FIG. 12 is a schematic view showing a cross-section of a laminated film 70 according to another embodiment including a first film 100 and a second film 200, a hard coating layer 300 disposed on the second film 200, a back coating layer 400 under the first film 100, and an adhesive layer or a hyperelastic layer 500 between the first film 100 and the second film 200, and a primer coating layer 700 between the first film 100 and the adhesive layer or hyperelastic layer 500.

FIG. 12 schematically shows a cross-sectional surface of the laminated film 70 according to another exemplary embodiment.

Referring to FIG. 12, the laminated film 70 according to an exemplary embodiment includes a first film 100 disposed on a front surface of the display panel of a display device which is not shown, a second film 200 disposed on first film 100, a hard coating layer 300 disposed on the second film 200, a back coating layer 400 disposed under the first film 100, and an adhesive layer or a hyperelastic layer 500 interposed between the first film 100 and the second film 200, and further includes a primer coating layer 700 interposed between the first film 100 and the adhesive layer or the hyperelastic layer 500.

The primer coating layer 700 may be optically colorless or transparent, or may control a color coordinate of the laminated film by adding a dye into a colorless, transparent medium. The primer coating layer 700 may include any suitable materials as long as it may be well attached with the upper adhesive layer or hyperelastic layer 500 and may maintain the toughness. For example, the primer coating layer 700 may include the same material as the hard coating layer 300 or may include suitable materials used for the hard coating layer of a window for a display device without any limitation. For example, the primer coating layer 700 may include a (meth)acrylate polymer, a polycaprolactone, a urethane-(meth)acrylate copolymer, a polyrotaxane, an epoxy resin, a siloxane copolymer, a perfluoropolyether, or a combination thereof.

A thickness of the primer coating layer 700 may be about 30 nm to about 300 nm, for example, about 40 nm to about 200 nm, for example, about 50 nm to about 180 nm, for example, about 60 nm to about 150 nm, for example, about 70 nm to about 130 nm, for example, about 80 nm to about 120 nm, for example, about 90 nm to about 120 nm and the primer coating layer 700 may be formed in a relatively thinner thickness than the hard coating layer 300.

A refractive index of the primer coating layer 700 may be less than or equal to about 1.7, for example, less than or equal to about 1.6, for example, less than or equal to about 1.5, for example less than or equal to about 1.4, for example, less than or equal to about 1.3.

The components of other layers except the primer coating layer 700 in FIG. 12 are the same as in FIGS. 6 to 11, so the detailed descriptions thereof are omitted here.

As illustrated in FIGS. 6 to 12, the laminated film according to one or more embodiments may further include the hard coating layer 300, the back coating layer 400, the adhesive layer or the hyperelastic layer 500, the second back coating layer 600, and the primer coating layer 700 according to the desirable usages or the required characteristics, besides the first film 100 and the second film 200, thus at least one characteristic of the mechanical properties, the optical characteristic, or the flexural property of the laminated film may be further improved or compensated. Accordingly, the ordinary skilled person in the art may select, arrange, or modify the various layers including the layers according to the desirable usage when manufacturing the laminated film according to an embodiment, so it is to be understood that the disclosure is intended to cover various selections, arrangements, and modifications.

As mentioned above, the second film to be disposed on the upper part of the display device in the laminated film according to an embodiment may have an elastic modulus that is greater than or equal to an elastic modulus of the first film to be contacted with a front surface of the display panel of the display device under the second film, and may have excellent mechanical properties such as hardness and strength and simultaneously may satisfy the optical characteristics such as high transmittance enough to be applied for a window for a display device. The material simultaneously satisfying both high mechanical characteristics and optical characteristics may include polyimide or poly(amide-imide) copolymer. Accordingly, in an example embodiment, the second film may include a polyimide or poly(amide-imide) copolymer.

The polyimide or poly(amide-imide) copolymer film has been used for a display substrate material as having high light transmittance, thermal stability, mechanical strength and flexibility or the like, but recently, it has also been attempted to apply the same for a hard window film to substitute a uppermost glass for a mobile device such as a smart phone, a tablet PC.

In an example embodiment, the polyimide or poly(amide-imide) copolymer included in the second film may be any suitable polyimide or poly(amide-imide) copolymer capable of being used for an optical film, for example, a polyimide including a structural unit represented by Chemical Formula 1; or a poly(amide-imide) copolymer including a structural unit represented by Chemical Formula 1 and a structural unit represented by Chemical Formula 2, which have high optical characteristics and mechanical properties:

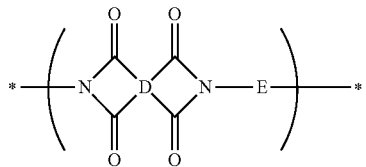

Chemical Formula 1

In Chemical Formula 1, D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 heteroaromatic ring group, wherein the aliphatic cyclic group, the aromatic ring group, or the heteroaromatic ring group is present as a single ring, a condensed ring system including two or more fused rings, or a combination of two or more single rings or two or more of the condensed rings that are linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, or —C(=O)NH—.

In Chemical Formula 1, E is a substituted or unsubstituted C1 to C30 alkylene group, a substituted or unsubstituted C2 to C30 alkenylene group, a substituted or unsubstituted C1 to C30 alkynylene group, a substituted or unsubstituted divalent C6 to C24 aliphatic cyclic group, a substituted or unsubstituted divalent C6 to C24 aromatic ring group, or a substituted or unsubstituted divalent C4 to C24 heteroaromatic ring group, wherein the aliphatic cyclic group, the aromatic ring group, or the heteroaromatic ring group is present as a single ring, a condensed ring system including two or more fused rings, or a combination of two or more of the single rings or two or more of the condensed rings linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—.

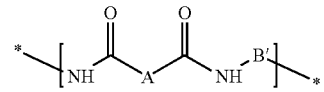

Chemical Formula 2 wherein, in Chemical Formula 2, each of A and B' are independently a substituted or unsubstituted C1 to C30 alkylene group, a substituted or unsubstituted C2 to C30 alkenylene group, a substituted or unsubstituted C1 to C30 alkynylene group, a substituted or unsubstituted divalent C6 to C24 aliphatic cyclic group, a substituted or unsubstituted divalent C6 to C24 aromatic ring group or a substituted or unsubstituted divalent C4 to C24 heteroaromatic ring group, wherein the aliphatic cyclic group, the aromatic ring group, or heteroaromatic ring group is present as a single ring, a condensed ring system including two or more fused rings, or a combination of two or more single rings or a combination of two or more condensed rings linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, or —C(=O)NH—.

In an embodiment, D of Chemical Formula 1 may independently be a moiety selected from chemical formulae of Formula Group 1:

Formula Group 1

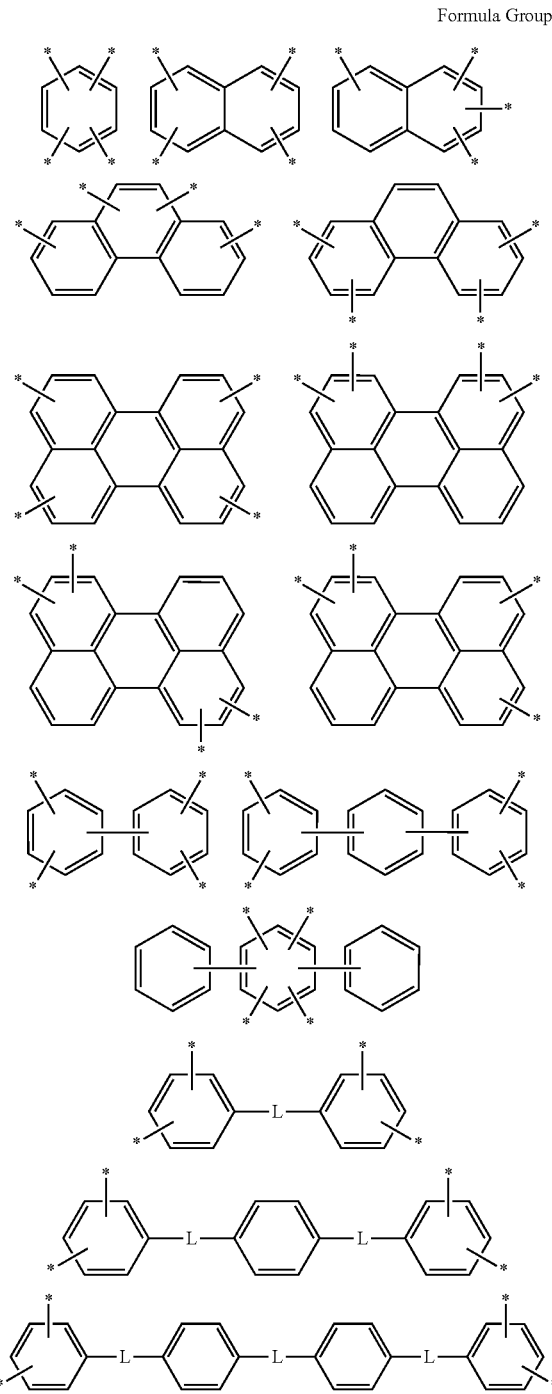

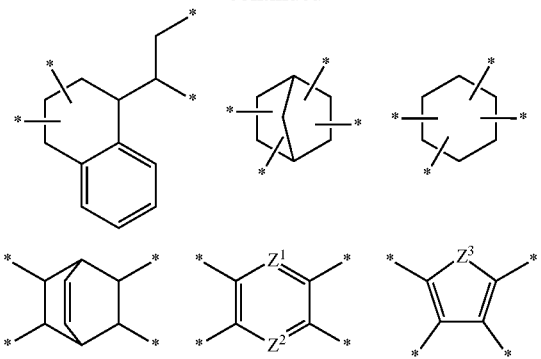

wherein, in the chemical formulae of Formula Group 1, each moiety may be substituted or unsubstituted, and each L is the same or different and is independently a single bond, —O—, —S—, —C(=O)—, —CH(OH)—, —S(=O)$_2$—, —Si(CH$_3$)$_2$—, —(CH$_2$)$_p$— wherein, 1≤p≤10, —(CF$_2$)$_q$— wherein, 1≤q≤10, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— wherein 1≤n≤10, 1≤p≤10, and 1≤q≤10, —C(CF$_3$)(C$_6$H$_5$)—, or —C(=O)NH—, * is a linking portion with an adjacent atom, Z$^1$ and Z$^2$ are the same or different and are independently —N= or —C(R$^{100}$)=, wherein R$^{100}$ is hydrogen or a C1 to C5 alkyl group, provided that Z$^1$ and Z$^2$ are not simultaneously —C(R$^{100}$)=, and Z$^3$ is —O—, —S—, or —NR$^{101}$-, wherein R$^{101}$ is hydrogen or a C1 to C5 alkyl group.

The chemical formulae represented by Formula Group 1 may be represented by a moiety represented by one or more of the chemical formulae of Formula Group 2, but are not limited thereto:

Formula Group 2

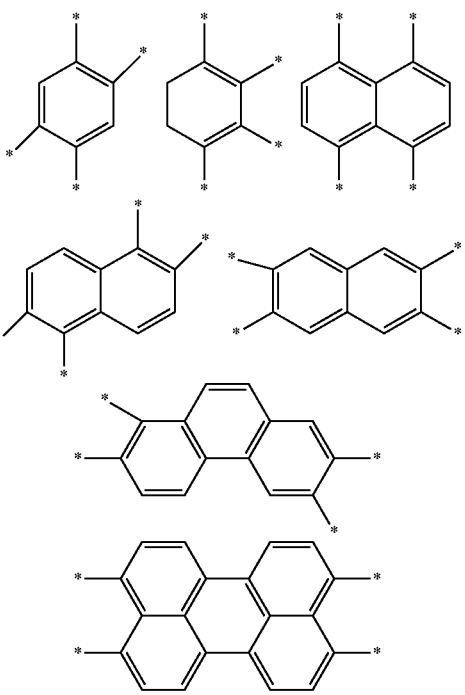

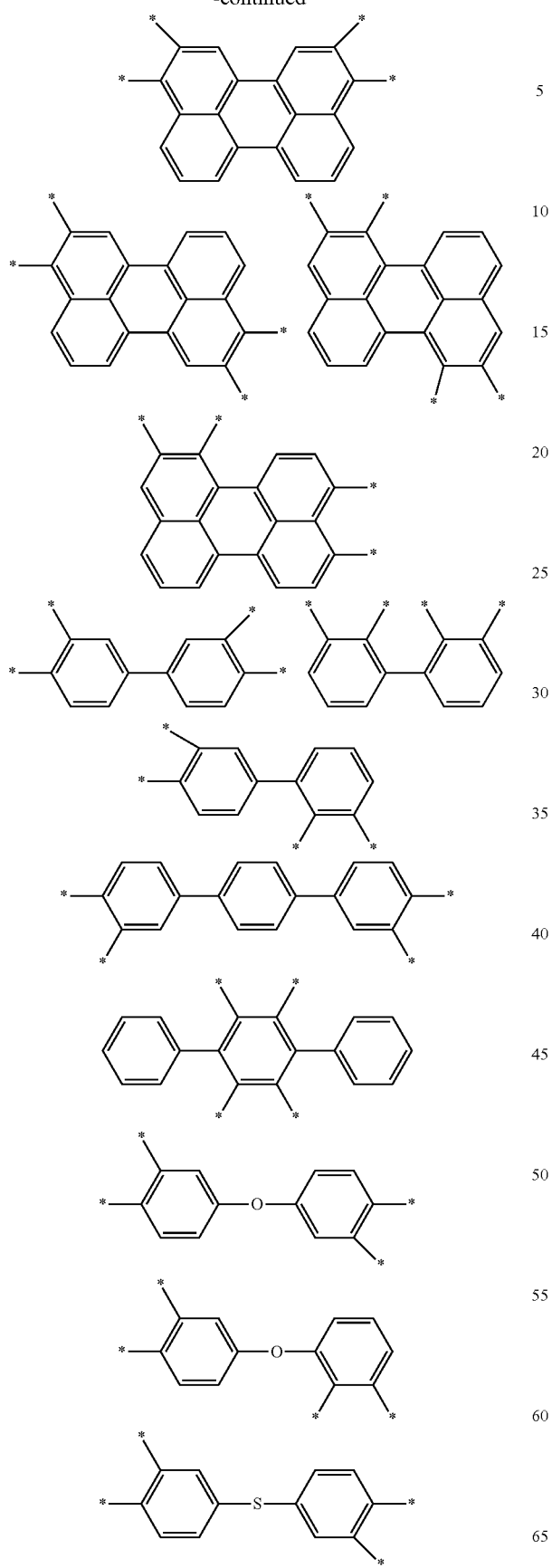
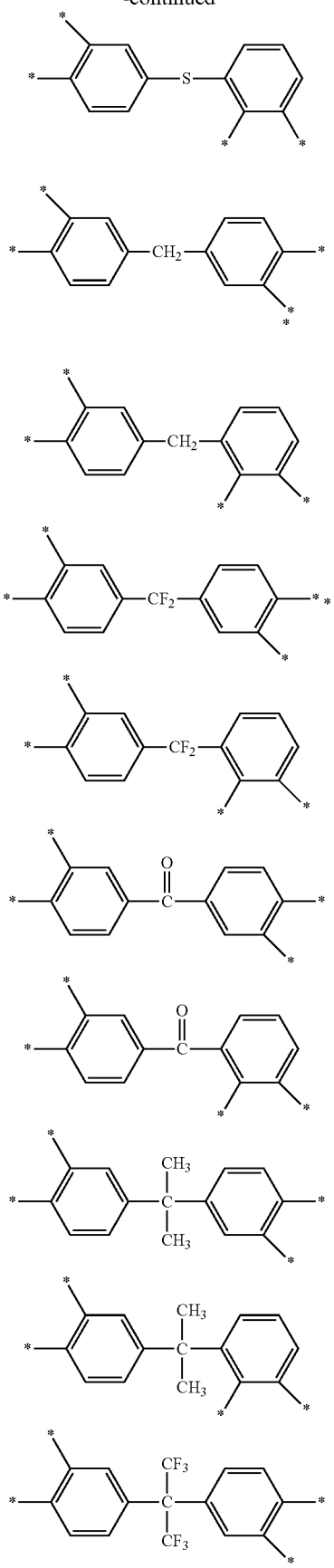

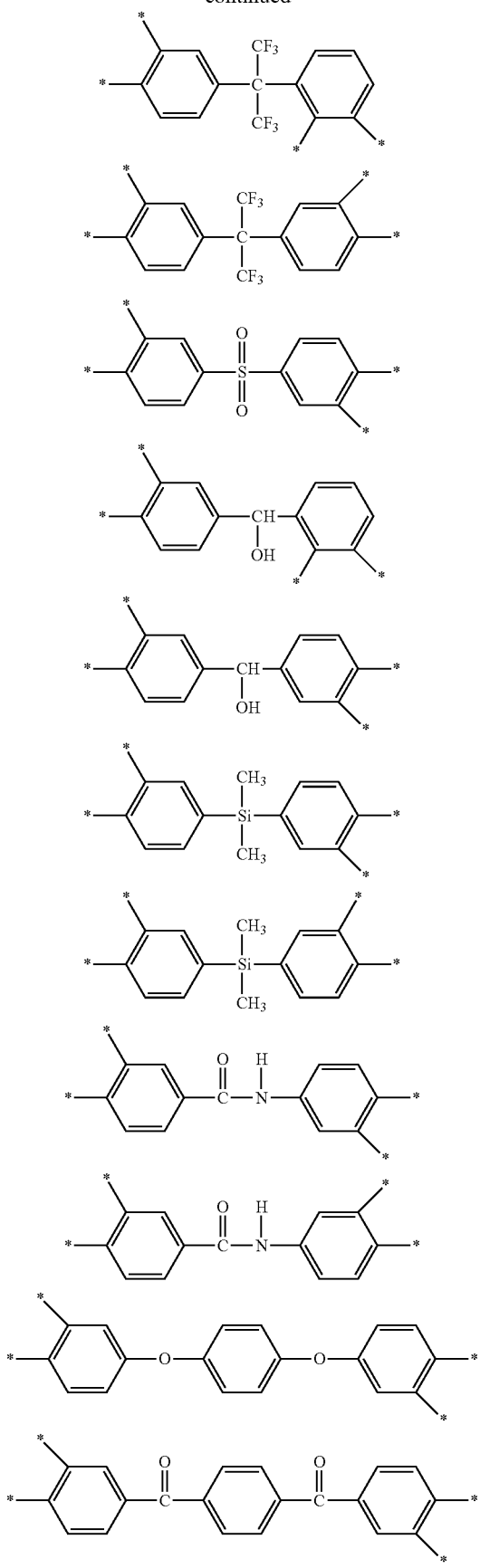

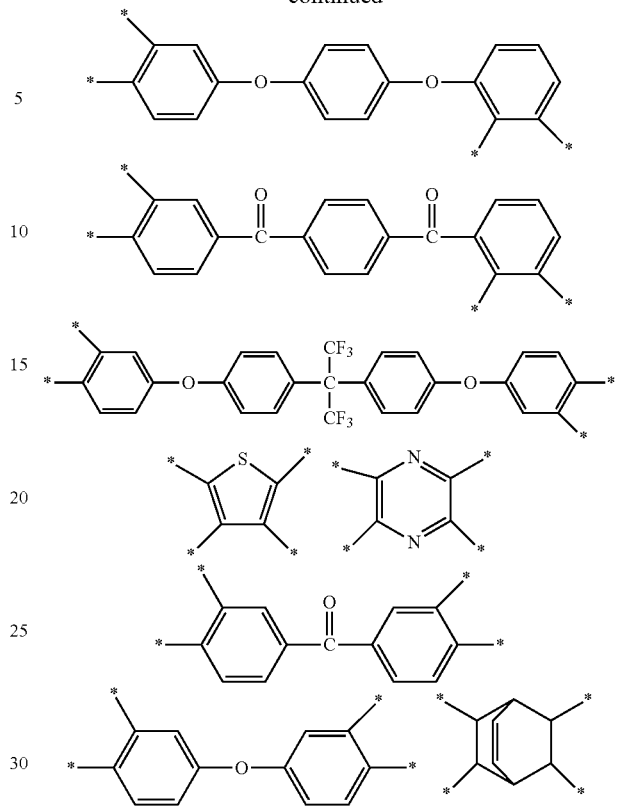

wherein E of Chemical Formula 1 and B' of Chemical Formula 2 each may independently be represented by Chemical Formula 5 or may be a substituted or unsubstituted C1 to C30 alkylene group:

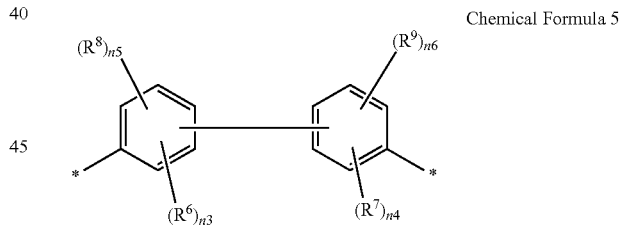

Chemical Formula 5

In Chemical Formula 5, each $R^6$ and $R^7$ are the same or different and are independently an electron withdrawing group, for example, —$CF_3$, —$CCl_3$, —$CBr_3$, —$Cl_3$, —F, —Cl, —Br, —I, —$NO_2$, —CN, —$COCH_3$, or —$CO_2C2H_5$, each $R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen, a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of less than or equal to 4, and n4 is an integer ranging from 1 to 4, n6 is an integer ranging from 0 to 3, provided that n4+n6 is an integer of less than or equal to 4.

In an embodiment, A of Chemical Formula 2 may be at least one moiety selected from the chemical formulae of Formula Group 3 or may be a substituted or unsubstituted C1 to C30 alkylene group:

Formula Group 3

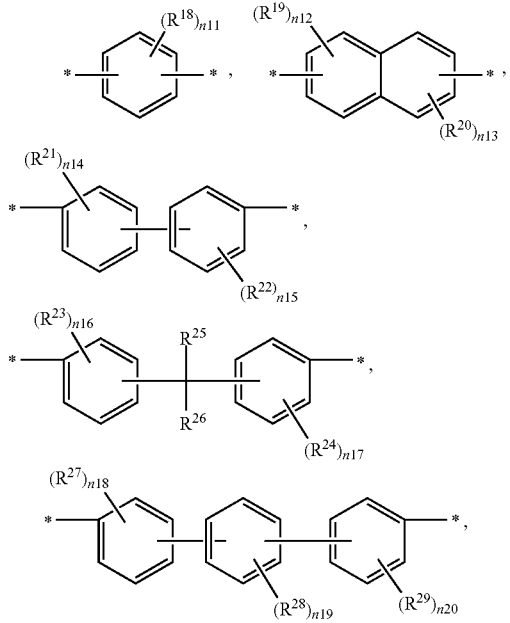

In the chemical formulae of Formula Group 3, each $R^{18}$ to $R^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are each independently an integer ranging from 0 to 4, and n12 and n13 are each independently an integer ranging from 0 to 3.

In an embodiment, the chemical formulae represented by Formula Group 3 may be represented by at least one moiety of chemical formulae of Formula Group 4, but are not limited thereto:

Formula Group 4

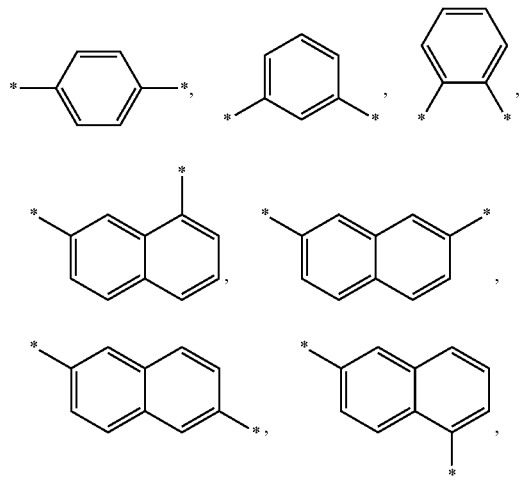

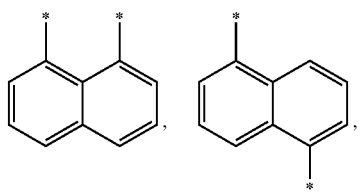

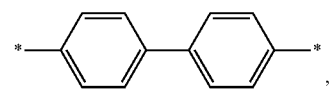

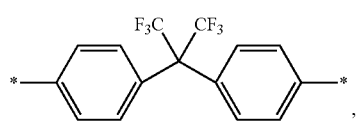

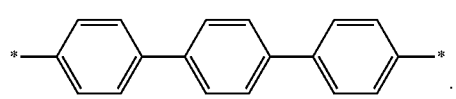

In an exemplary embodiment, the structural unit represented by Chemical Formula 1 may include at least one of a structural unit represented by Chemical Formula 9 and a structural unit represented by Chemical Formula 10:

Chemical Formula 9

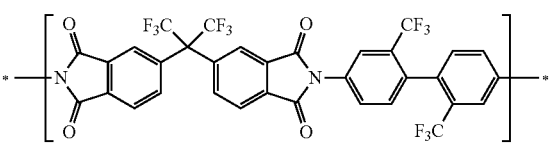

Chemical Formula 10

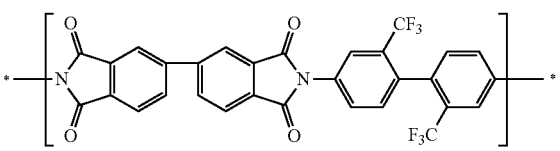

In an exemplary embodiment, the structural unit represented by Chemical Formula 2 may include at least one of structural units represented by Chemical Formula 6 to Chemical Formula 8:

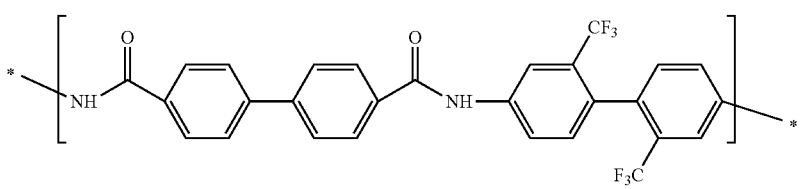

Chemical Formula 6

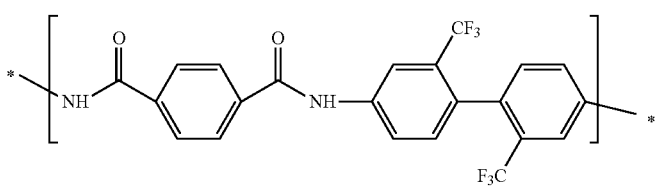

Chemical Formula 7

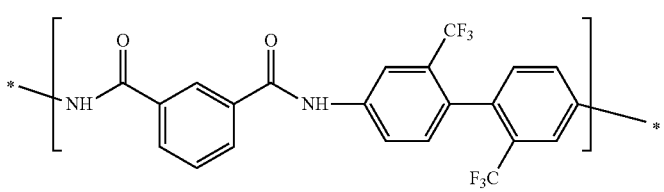

Chemical Formula 8

In an exemplary embodiment, the second film may include a polyimide copolymer including at least one structural unit represented by Chemical Formula 9 and at least one structural unit represented by Chemical Formula 10, or a poly(amide-imide) copolymer including at least one structural unit represented by Chemical Formula 9, at least one structural unit represented by Chemical Formula 10, and at least one structural unit represented by Chemical Formula 7:

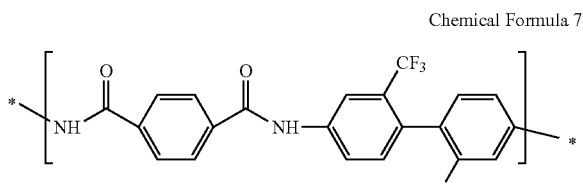

Chemical Formula 7

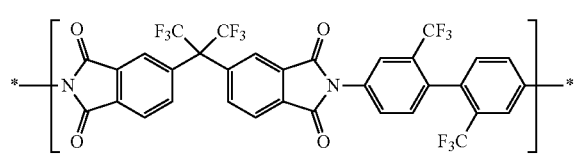

Chemical Formula 9

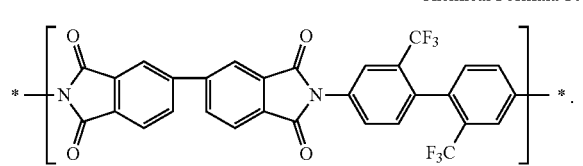

Chemical Formula 10

In an exemplary embodiment, the second film may include a poly(amide-imide) copolymer including at least one structural unit represented by Chemical Formula 9, at least one structural unit represented by Chemical Formula 10, and at least one structural unit represented by Chemical Formula 7, wherein the structural unit represented by Chemical Formula 7 may be included in an amount of about 30 mol % to about 80 mol %, for example, about 35 mol % to about 80 mol %, for example, about 40 mol % to about 80 mol %, for example, about 45 mol % to about 80 mol %, for example, for example, about 50 mol % to about 80 mol %, for example, about 55 mol % to about 80 mol %, for example, about 60 mol % to about 80 mol %, for example, about 65 mol % to about 80 mol %, for example, about 65 mol % to about 75 mol %, for example, about 65 mol % to about 70 mol % of the total amount of structural units constituting the poly(amide-imide) copolymer, and at least one of the structural unit represented by Chemical Formula 9 and the structural unit represented by Chemical Formula 10 may be included in an amount of about 20 mol % to about 70 mol %, for example, about 20 mol % to about 65 mol %, for example, about 20 mol % to about 60 mol %, for example, about 20 mol % to about 55 mol %, for example, about 20 mol % to about 50 mol %, for example, about 20 mol % to about 45 mol %, for example, about 20 mol % to about 40 mol %, for example, about 20 mol % to about 35 mol %, for example, about 25 mol % to about 35 mol %, for example, about 25 mol % to about 30 mol % of the total amount of structural units constituting the poly(amide-imide) copolymer.

The second film including the poly(amide-imide) copolymer including the imide structural unit and the amide structural unit within the amount ranges disclosed herein may have a high mechanical strength, for example, a high tensile modulus, for example, a tensile modulus of greater than or equal to about 5 GPa and a high surface hardness, for example, a pencil scratch hardness of greater than or equal to H when measured at a vertical load of about 500 grams according to ASTM D3363, and may also have excellent optical characteristics, for example, a visible light (e.g., 300 to 800 nm) transmittance of greater than or equal to about 88%, a low yellow index (YI), for example, YI of less than or equal to about 3, and a low haze, and a high anti-UV characteristics, or the like.

The first film to be disposed under the second film may have excellent mechanical properties, for example, a tensile modulus less than or equal to a tensile modulus of the second film; on the other hand, the first film may have optical characteristic superior to or same as that of the second film.

For example, the first film may have a visible light (e.g., 300 to 800 nm) transmittance of greater than or equal to about 89%, and the material having the high transmittance may include a combination of suitable polymer materials including those disclosed herein.

For example, the first film may include polyimide, a poly(amide-imide) copolymer, polyamide, polyethylene terephthalate (PET), polyethylene naphthalate (PEN), polycarbonate (PC), triacetyl cellulose (TAC), or a combination thereof, but is not limited thereto.

As described in above, the first film may have optical characteristics that are better than or the same as that of the second film, for example, the first film may have better optical characteristics than that of the second film, but, the mechanical properties such as tensile modulus and/or surface hardness thereof may be equal to or lower than those of the second film. In an exemplary embodiment, the tensile modulus of the first film may be greater than or equal to about 4 GPa.

Although the first film may have optical characteristic superior to or at least equal to that of the second film, the mechanical properties may be greater than or equal to the predetermined range. In an exemplary embodiment, when the first film has a modulus of greater than or equal to about 4 GPa, the laminated film including the first film and the second film may further have improved optical characteristics and mechanical properties. In this point, the first film may include a variety of conventional polymers having excellent optical characteristics, but in an exemplary embodiment, the first film may also include a polyimide or poly(amide-imide) copolymer.

In an exemplary embodiment, both the first film and the second film may include a polyimide or poly(amide-imide) copolymer, for example, the first film and the second film each may include a polyimide including the same imide structural unit or a poly(amide-imide) copolymer including the same imide structural unit and amide structural unit. In an embodiment, the polyimide or poly(amide-imide) copolymer included in the first film and the second film each may respectively include different amounts of the imide structural unit and/or the amide structural unit, so that the first film and the second film are different films from each other. Alternatively, they are controlled and assembled by adjusting a thickness of the first film and the second film, so that at least one of optical characteristics or mechanical properties may be different.

In an exemplary embodiment, the first film and the second film each may include a poly(amide-imide) copolymer including at least one of the structural unit represented by Chemical Formula 9, the structural unit represented by Chemical Formula 10, and the structural unit represented by Chemical Formula 7. Herein, the poly(amide-imide) copolymer included in the first film and the second film each may independently include the structural unit represented by Chemical Formula 7 in an amount of about 30 mol % to about 80 mol %, for example, about 35 mol % to about 80 mol %, for example, about 40 mol % to about 80 mol %, for example, about 45 mol % to about 80 mol %, for example, for example, about 50 mol % to about 80 mol %, for example, about 55 mol % to about 80 mol %, for example, about 60 mol % to about 80 mol %, for example, about 65 mol % to about 80 mol %, for example, about 65 mol % to about 75 mol %, for example, about 65 mol % to about 70 mol % of the total amount of structural units constituting the poly(amide-imide) copolymer, at least one of the structural unit represented by Chemical Formula 9 and the structural unit represented by Chemical Formula 10 may be included in an amount of about 20 mol % to about 70 mol %, for example, about 20 mol % to about 65 mol %, for example, about 20 mol % to about 60 mol %, for example, about 20 mol % to about 55 mol %, for example, about 20 mol % to about 50 mol %, for example, about 20 mol % to about 45 mol %, for example, about 20 mol % to about 40 mol %, for example, about 20 mol % to about 35 mol %, for example, about 25 mol % to about 35 mol %, for example, about 25 mol % to about 30 mol % of the total amount of structural units constituting the poly(amide-imide) copolymer, and amounts of the at least one of the structural unit represented by Chemical Formula 9 and the structural unit represented by Chemical Formula 10, and the structural unit represented by Chemical Formula 7, each may be controlled to form each poly(amide-imide) copolymer so that the second film may have a higher tensile modulus than the first film or the same tensile modulus as the first film and the first film may have a higher transmittance than the second film or the same transmittance.

Generally, it is known that the film or the like including a poly(amide-imide) copolymer may have higher mechanical properties as the amount of the amide structural unit is higher in the structural units for forming the poly(amide-imide) copolymer. In addition, an ordinary skilled in the art understands that the mechanical properties and the optical characteristic or the like of the film may be different depending upon the kind of diamine, dianhydride and dicarboxylic acid derivative for forming the poly(amide-imide) copolymer as well as the amounts of the amide structural unit and the imide structural unit. Thus, the ordinary skilled person in the art may produce the various window films according to an embodiment by selecting a variety of associations of the first film and the second film using the technologies in the art, and the present invention covers all the window films.

The polyimide or poly(amide-imide) copolymer including the structural unit may be prepared using the suitable polyimide and polyamide manufacturing methods, including those known in the art, or may be commercially available.

For example, an imide structural unit constituting the polyimide or the poly(amide-imide) copolymer may be prepared by reacting diamine with dianhydride in an organic solvent.

Examples of the diamine compound may be hexamethylene diamine; m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl) diphenyl silane; bis(4-aminophenyl) ethyl phosphineoxide; bis(4-aminophenyl) phenyl phosphineoxide; bis(4-aminophenyl)-N-phenyl amine; bis(4-aminophenyl)-N-methylamine; 1,2-diamino-naphthalene; 1,4-diamino-naphthalene; 1,5-diamino-naphthalene; 1,6-diamino-naphthalene; 1,7-diamino-naphthalene; 1,8-diamino-naphthalene; 2,3-diamino-naphthalene; 2,6-diamino-naphthalene; 1,4-diamino-2-methyl-naphthalene; 1,5-diamino-2-methyl-naphthalene; 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 3,3'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichlorobenzene; 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene; 1,4-bis(2-methyl-4-amino-pentyl)-benzene; 1,4-bis(1,1-dimethyl-5-amino-pentyl)-benzene; 1,4-bis(4-aminophenoxy)-benzene; o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantane; bis[2-(3-aminophenyl) hexafluoroisopropyl] diphenyl ether; 3,3'-diamino-1,1,1'-diadamantane; N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl]hexafluoropropane; 2,2-bis[4-(2-chloro-4-aminophenoxy)phenyl hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane; 1,4-bis(3-aminophenyl) buta-1-ene-3-yne; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl] diphenyl ether, diaminocyclohexane, bicyclohexyldiamine, 4,4'-diaminocyclohexylmethane, and diaminofluorene, but are not limited thereto. Such a diamine compound may be commercially available or may be synthesized by a known method.

For example, the diamine compound may be hexamethylene diamine or compounds of the following structures:

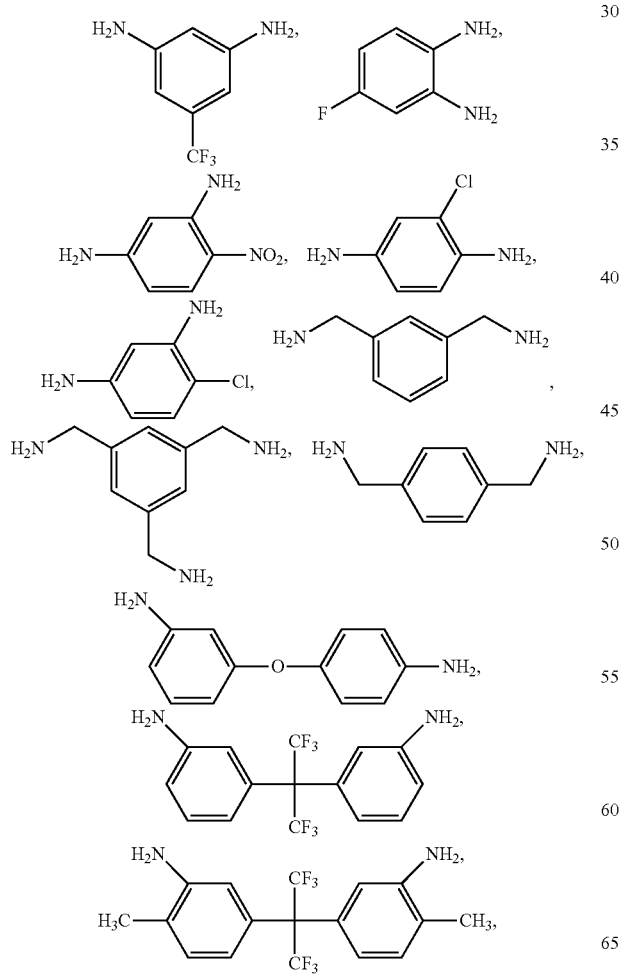

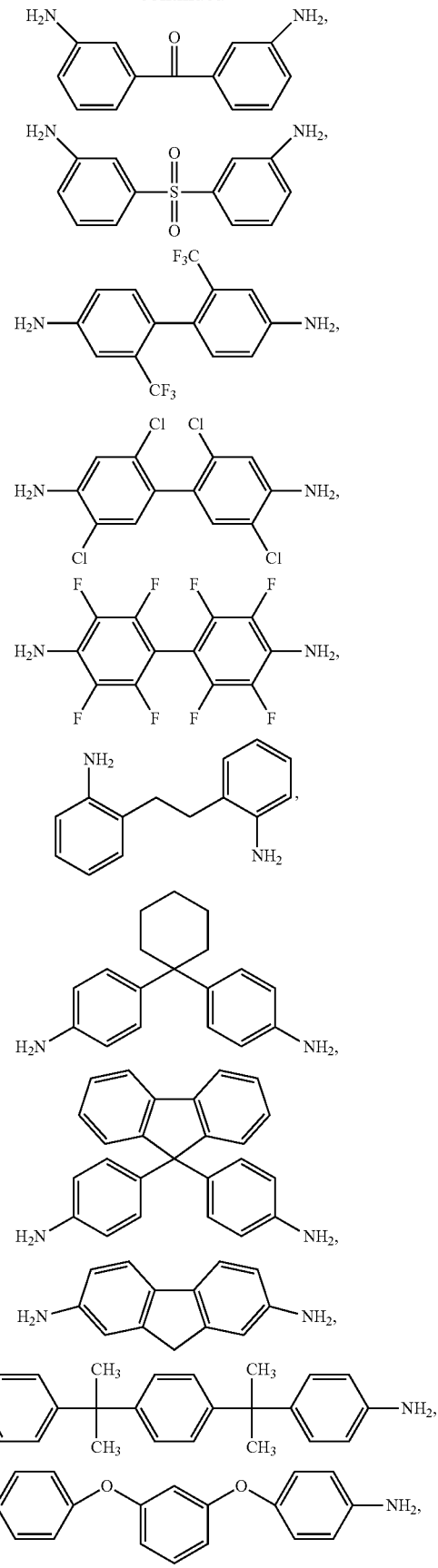

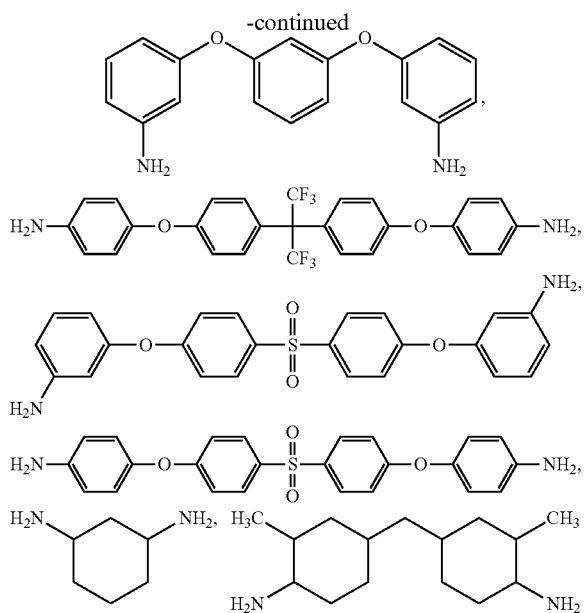

In an exemplary embodiment, the diamine compound may be 2,2'-bis(trifluoromethyl)benzidine (TFDB).

The dianhydride may be tetracarboxylic dianhydride, and such a compound may be one or more selected from 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 3,3',4,4'-biphenyl tetracarboxylic dianhydride; 2,2',3,3'-biphenyl tetracarboxylic dianhydride; 4,4'-bis(3,4-dicarboxylic phenoxy)diphenyl dianhydride; bis(2,3-dicarboxylphenyl) ether dianhydride; 4,4'-bis(2,3-dicarboxylic phenoxy) diphenylether dianhydride; 4,4'-bis(3,4-dicarboxylic phenoxy) diphenylether dianhydride; bis(3,4-dicarboxylphenyl) sulfide dianhydride; 4,4'-bis(2,3-dicarboxylic phenoxy) diphenylsulfide dianhydride; 4,4'-bis(3,4-dicarboxylic phenoxy) diphenyl sulfide dianhydride; bis(3,4-dicarboxylphenyl) sulfone dianhydride; 4,4'-bis(2,3-dicarboxylic phenoxy) diphenylsulfone dianhydride; 4,4'-bis(3,4-dicarboxylphenoxy) diphenylsulfone dianhydride; 3,3',4,4"-benzophenone tetracarboxylic dianhydride; 2,2',3,3'-benzophenone tetracarboxylic dianhydride; 2,3,3'4'-benzophenone tetracarboxylic dianhydride; 4,4'-bis(3,4-dicarboxylphenoxy) benzophenone dianhydride; bis(2,3-dicarboxylphenyl) methane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride; 1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxylphenoxy) phenyl] propane dianhydride; 2,2-bis[4-(3,4-dicarboxylphenoxy) phenyl]propane dianhydride; 4-(2,3-dicarboxylphenoxy)-4'-(3,4-dicarboxylphenoxy) diphenyl-2,2-propane dianhydride; 2,2-bis[4-(3,4-dicarboxylphenoxy-3,5-dimethyl) phenyl] propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 2,2-bis(3,4-dicarboxylphenyl) hexafluoropropane dianhydride; 1,3-bis(3,4-dicarboxylphenyl) hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy) phenyl] hexafluoropropane dianhydride; 1,1-bis[4-(3,4-dicarboxylphenoxy) phenyl]-1-phenyl-2,2,2-trifluoro ethane dianhydride; and 4,4'-bis[2-(3,4-dicarboxylphenyl)hexafluoroisopropyl] diphenyl ether, but are not limited thereto. Such a dianhydride compound may be commercially available or may be synthesized by a known method.

In an exemplary embodiment, the tetracarboxylic dianhydride may include 3,3',4,4'-biphenyl tetracarboxylic dianhydride (BPDA), 4,4'-(hexafluoroisopropylidene)diphthalic anhydride (6FDA), or a combination thereof.

On the other hand, a method of preparing polyamide may be a low temperature solution polymerization method, an interface polymerization method, a melt polymerization method, a solid-phase polymerization method, and the like. For example, the low temperature solution polymerization method may be performed by reacting a carboxylic acid dihalide with diamine in an aprotic polar solvent to form an amide structural unit represented by Chemical Formula 2.

The carboxylic acid dihalide may be terephthaloyl chloride (TPCl), isophthaloyl chloride (IPCl), biphenyl dicarbonylchloride (BPCl), naphthalene dicarbonylchloride, terphenyl dicarbonylchloride, 2-fluoro-terephthaloyl chloride, adipoyl chloride, sebacoyl chloride, and the like, but is not limited thereto.

In an exemplary embodiment, the carboxylic acid dihalide may be terephthaloyl chloride (TPCl).

The diamine for the amide structure may include the same diamine compound as the diamine which may be used for forming the imide structure. That is, the amide structure may be obtained by using at least one kind of diamines which are different or same among the exemplified diamine compounds.

In an exemplary embodiment, the diamine for forming the amide structure together with the carboxylic dihalide may be 2, 2'-bis(trifluoromethyl)benzidine (TFDB).

The aprotic polar solvent may be for example a sulfoxide-based solvent such as dimethylsulfoxide, diethylsulfoxide, and the like, a formamide-based solvent such as N,N-dimethyl formamide, N,N-diethylformamide, and the like, an acetamide-based solvent such as N,N-dimethyl acetamide, N,N-diethylacetamide, and the like, a pyrrolidone-based solvent such as N-methyl-2-pyrrolidone, N-vinyl-2-pyrrolidone, and the like, a phenol-based solvent such as phenol, o-, m- or p-cresol, xylenol, halogenated phenol, catechol, and the like, or hexamethylphosphorusamide, γ-butyrolactone, and the like. These may be used alone or as a mixture. However, this is not limited thereto, and an aromatic hydrocarbon such as xylene and toluene may be used.

The amide structural unit is formed by putting diamine and dicarboxylic dihalide in the same reactor and reacting them, and then, diamine and dianhydride for forming the imide structural unit are added thereto and reacted therewith, preparing a poly(amide-amic acid) copolymer.

In another embodiment, the diamine and the dicarboxylic dihalide for forming the amide structural unit are reacted to prepare an amide oligomer having an amino group at both ends, and dianhydride is added to the resultant as a diamine monomer to prepare a poly(amide-amic acid) copolymer. The latter method may need no precipitation process for removing HCl generated from a process of forming amide and thus shorten a process time and increase a yield of producing a final product, the poly(amide-imide) copolymer.

The obtained polyamic acid or poly(amide-amic acid) copolymer is performed with a dehydration ring-closure reaction of amic acid to provide polyimide and poly(amide-imide) copolymer, and it is well known that a solution including the polyimide or poly(amide-imide) copolymer is casted on a support and cured by drying or heating the same to provide a molded article such as a film according to known solution casting methods.

The first film and the second film including each of the obtained polyimide or poly(amide-imide) copolymer are laminated to provide a laminated film according to an embodiment, and the obtained laminated film may have a higher toughness than the single film including only a polyimide or poly(amide-imide) copolymer for the first film or a polyimide or poly(amide-imide) copolymer for the second film. For example, the laminated film according to an embodiment obtained by laminating the first film and the second film having each thicknesses of about 50 μm may pass a toughness test of repeating the folding and unfolding for about 100,000 times, for example, about 150,000 times, for example, for about 200,000 times at a flexural radius of less than or equal to about 5 mm, for example, at a flexural radius of less than or equal to about 3 mm, for example, at a flexural radius of less than or equal to about 1 mm. On the other hand, a monolayer film obtained by using the same poly(amide-imide) copolymer used for the first film in a thickness of 80 μm fails to pass the toughness test. Furthermore, a monolayer obtained by using the same poly(amide-imide) copolymer used for the second film in a thickness of 80 μm also fails to pass the toughness test.

That is, the laminated film according to an embodiment obtained by separately manufacturing the first film and the second film and laminating the same, significantly enhances toughness, comparing to the monolayer film obtained by only increasing a thickness of each film used for the first film and the second in a range similar to that of the film according to the embodiment. In addition, it is understood that the laminated film according to an embodiment almost does not deteriorate mechanical characteristics and optical characteristics pertained to the first film and the second film. Accordingly, the laminated film according to an embodiment may simultaneously improve the light transmission characteristics, the mechanical characteristics, and the toughness, which is difficult to be accomplished by a monolayer film. The laminated film may be usefully applied for a display device, particularly, a window for a flexible display device.

Hereinafter, one or more exemplary embodiments are described with reference to examples and comparative examples. The following examples and comparative examples are illustrative but do not limit the scope of the present disclosure.

EXAMPLES

Synthesis Example 1: Preparation of Amide Group-Containing Oligomer 1 molar equivalent (0.122 moles (mol), 39.2 grams (g)) of 2,2'-bis(trifluoromethyl)benzidine (TFDB) and 2.8 molar equivalent (0.343 mol, 27.11 g) of pyridine are dissolved in a solvent of 700 g of N,N-dimethyl acetamide in a round-bottomed flask, and then the remaining TFDB is dissolved with additional 50 milliliters (mL) of dimethyl acetamide (DMAC). Then, 0.7 molar equivalents (0.086 mol, 17.4 g) of terephthaloyl chloride (TPCL) is divided into four portions and mixed with the TFDB solution at 25° C. and the mixture is vigorously agitated for 15 minutes.

Subsequently, the resultant solution is agitated under the nitrogen atmosphere for 2 hours and added into 7 liters (L) of a NaCl solution containing 350 g of NaCl. Then, the mixture is agitated for 10 minutes. Subsequently, the solid is filtered and re-suspended twice in 5 L of deionized water and re-filtered. Subsequently, the remaining water is removed as much as possible by appropriately pressing the final filtered product and dried at 90° C. under the vacuum for 48 hours to provide an amide group-containing oligomer represented by Chemical Formula A. The obtained amide group-containing oligomer has a number average molecular weight (Mn) of about 997 Daltons (Da).

Chemical Formula A

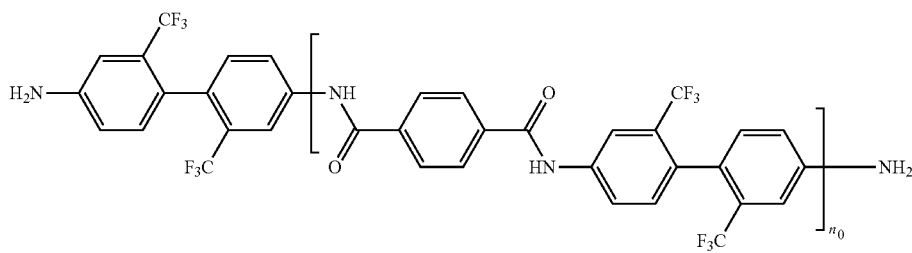

In Chemical Formula A, no is an integer of greater than or equal to 0.

Preparation Example 1: Preparation of Poly(Amide-Imide) Copolymer Solution 21.7 g (0.0152 mol) of amide group-containing oligomer obtained from Synthesis Example 1 and 143 mL of dimethyl acetamide (DMAc) are added into a 250 mL 4-necked dual walled reactor having a mechanical agitator and a nitrogen inlet and is pre-heated at 30° C. Subsequently, the solution is agitated at 30° C. under the nitrogen atmosphere until the oligomer is completely dissolved, and 3.73 g (0.0084 mol) of 4,4'-(hexafluoroisopropylidene)diphthalic anhydride (6FDA) and 2.00 g (0.0068 mol) of 3,3',4,4'-biphenyltetra-carboxylic dianhydride (BPDA) are slowly added thereto. Subsequently, after further adding 10 mL of dimethyl acetamide (DMAc) thereto, the solution is agitated for 48 hours to provide a poly(amide-amic acid) copolymer solution having a solid concentration of 16 wt %. Subsequently, after cooling the temperature to 25° C., 4.6 g of anhydrous acetic anhydride is added to the poly(amide-amic acid) copolymer solution and agitated for 30 minutes, and then 3.6 g of pyridine was added thereto, and the resulting combination was further agitated for 48 hours to provide a poly(amide-imide) copolymer solution.

Preparation Example 2: Preparation of Poly(Amide-Imide) Copolymer Solution 8.341 g of amide group-containing oligomer obtained from Synthesis Example 1 and 110 mL of dimethyl acetamide (DMAc) are added into a 250 mL 4-necked dual walled reactor having a mechanical agitator and a nitrogen inlet and is pre-heated to 30° C. Subsequently, the solution is agitated at 30° C. under the nitrogen atmosphere until the oligomer is completely dissolved, and 12.05 g of 6FDA, 1.332 g of BPDA, and 8.273 g of TFDB are slowly added thereto. Subsequently, after further adding 10 mL of dimethyl acetamide (DMAc) thereto, the solution is agitated for 48 hours to provide a poly(amide-amic acid) copolymer solution having a solid concentration of 18.5 wt %. Subsequently, after cooling the temperature to 25° C., 9.7 g of anhydrous acetic anhydride is added to the poly(amide-amic acid) copolymer solution and agitated for 30 minutes, and then 2.5 g of pyridine was added thereto, and the resulting combination was further agitated for 48 hours to provide a poly(amide-imide) copolymer solution.

Preparation Example 3: Preparation of Poly(Amide-Imide) Copolymer Solution 19.07 g of amide group-containing oligomer obtained from Synthesis Example 1 and 110 mL of dimethyl acetamide (DMAc) are added into a 250 mL 4-necked dual walled reactor having a mechanical agitator and a nitrogen inlet and is pre-heated to 30° C. Subsequently, the solution is agitated at 30° C. under the nitrogen atmosphere until the oligomer is completely dissolved, and 3.936 g of 6FDA, 1.531 g of BPDA, 1.75 g of 2,2'-Bis(trifluoromethyl)-4,4'-diaminodiphenyl ether (6FODA), and 0.713 g of TFDB are slowly added thereto. Subsequently, after further adding 10 mL of dimethyl acetamide (DMAc) thereto, the solution is agitated for 48 hours to provide a poly(amide-amic acid) copolymer solution having a solid concentration of 19 wt %. Subsequently, after cooling the temperature to 25° C., 6.38 g of anhydrous acetic anhydride is added to the poly(amide-amic acid) copolymer solution and agitated for 30 minutes, and then combined with 2.5 g of pyridine and further agitated for 48 hours to provide a poly(amide-imide) copolymer solution.

Examples 1 and 2 and Comparative Examples 1 to 9: Manufacture of Window Film

Films are manufactured from the poly(amide-imide) copolymer solutions obtained in each of Preparation Examples 1 to 3, and laminated films according each of Examples 1 and 2 and Comparative Examples 1 to 9 are manufactured by including each of the films alone or assembling at least two of the obtained films.

Specifically, the method of manufacturing films may include: casting a poly(amide-imide) copolymer solution obtained by each Preparation Example on a support, which is a polyimide film or a glass plate, and drying and heat-treating the same. In this case, the window films according to Comparative Examples 1 to 5 are mono-layered films having a thickness shown in Tables 1A and 1B, obtained by using each of the individual poly(amide-imide) copolymer solutions obtained from Preparation Examples 1 to 3. In this case, the films according to Comparative Examples 1 and 3, each of which has a thickness is 80 μm, are prepared by casting the poly(amide-imide) copolymer solutions on the polyimide film substrate. On the contrary, the films according to Comparative Examples 2, 4, and 5, each of which has a thickness is 36 μm, are prepared by casting the poly(amide-imide) copolymer solutions on the glass plate substrate. However, the films do not have any difference in properties due to the type of the substrate.

Meanwhile, the window films according to Examples 1 and 2 and Comparative Examples 6 to 9 are laminated films obtained by preparing films using each of the poly(amide-imide) copolymer solutions prepared in Preparation Examples 1 to 3; assembling the film as to two sheets of films; and laminating the same as a first film and a second film to form a laminated film. In this case, a PSA film (3M, OCA) having a thickness of about 50 μm is interposed between the first film and the second film as a point adhesive. Each thickness of the first film and second film is about 36 μm. These films are also prepared by casting the poly(amide-imide) copolymer solutions on the glass plate substrate. Tables 2A and 2B show the type of poly(amide-imide) copolymer that is used for forming the first layer and the second layer of the laminated films obtained from Examples 1 and 2, and Comparative Examples 6 to 9. Wherein, the first film refers to a film to be disposed on a front surface of a display panel of a display device, and the second film refers to a film to be disposed on the first film, as defined in above.

In addition, a thickness, optical properties, mechanical properties, and toughness of the obtained laminated films are shown in Tables 1A, 1B, 2A, and 2B. Wherein, a transmittance and a yellow index (YI) are measured as the optical properties; a pencil hardness, a tensile modulus, and an indentation hardness are measured as the mechanical properties; and the toughness is determined by pass or fail of the test of folding and unfolding the film for 200,000 times at a flexural radius at 1 mm.

The specific methods of measuring each property are as follows:

Thickness Measurement

A micrometer (Mitutoyo Corp.) is used for the measurement.

Transmittance and Yellow Index (YI)

Yellowness index (YI) and the transmittance (i.e., total light transmission) are measured from 360 nm to 740 nm using a spectroscope CM-3600d manufactured by KONICA MINOLTA, and the YI is a value determined according to ASTM E313-73, and the transmittance is obtained from Y(D65) value.

Refractive Index

The refractive index is measured at a wavelength of 550 nm in a visible ray region with an Ellipsometer (M-2000, J.A. Woollam Co.) by setting a Gen-Osc model.

Pencil Hardness

Using a pencil hardness tester and a Mitsubishi pencil, a pencil scratch hardness is measured according to ASTM D3363. Specifically, the hardness is obtained by measuring five times, wherein the film is fixed on a glass plate having a thickness of 2 mm, and then is scratched at a pencil speed of 60 millimeters per minute (mm/min) under a vertical load of 500 g every 10 mm to find the highest hardness with no scratches on the surface of the film.

Tensile Modulus

The film specimen having a width of 10 mm and a length of 50 mm is stretched at room temperature at a rate of 0.5 millimeters per millimeter per minute (mm/mm/min) by an Instron 3365 instrument, and each sample is measured five times according to ASTM D882, and the average thereof is obtained.

Indentation Hardness

Using a micro indenter (Model name: HM2000) manufactured by Fischerscope, a 10 millinewton (mN) force is vertically applied on the film surface at a rate of 1 millinewtons per second (mN/s) by a diamond tip, and then the force is reduced to 0 at a rate of 1 mN/s, and the indentation hardness HV (Vickers Pyramid Number) and HIT (degree of elastic deformation, %) are measured. The indentation hardness is obtained by dividing the force applied to the tip by the surface area of the tip after the indentation; and HIT refers to a percentage ratio of indentation energy which is elastically recovered when reducing the force from the entire indentation energy when applying the force.

Flexural Test

A flexural test of the films is conducted by using a flexibility measuring device (CFT-200, Covetech) by repeating the folding and unfolding of a sample film at a flexural radius (i.e., curvature radius) of 1 mm for 200,000 times. After the 200,000th flexural test, the case of generating a whitening or a crack in the folded portion indicates to "FAIL," but the case of capable of being smoothly folded and unfolded without any change indicates to "PASS."

TABLE 1A

|  | Poly(amide-imide) copolymer | Thickness | Transmittance (%) | YI |
|---|---|---|---|---|
| Comparative Example 1 | Preparation Example 1 | 80 μm | 88.2 | 2.62 |
| Comparative Example 2 | Preparation Example 1 | 36 μm | 88.6 | 1.56 |
| Comparative Example 3 | Preparation Example 2 | 80 μm | 89.6 | 1.54 |
| Comparative Example 4 | Preparation Example 2 | 36 μm | 89.8 | 1.08 |
| Comparative Example 5 | Preparation Example 3 | 36 μm | 89.2 | 1.38 |

Table 1B

|  | Pencil hardness (500 g) | Elastic modulus (GPa) | Indentation hardness (HV) (N/mm$^2$) | Elastic deformation ($H_{IT}$) (%) | Flexural property (1 mm flexural radius/200,000) |
|---|---|---|---|---|---|
| Comparative Example 1 | 2H–3H | 5.8 | 83.5 | 89.0 | FAIL |
| Comparative Example 2 | F | 6.1 | 41.6 | 85.7 | PASS |
| Comparative Example 3 | F~H | 4.6 | 74.0 | 85.8 | FAIL |
| Comparative Example 4 | HB~F | 4.4 | 35.4 | 82.9 | PASS |
| Comparative Example 5 | H~2H | 5.6 | 43.4 | 83.1 | PASS |

TABLE 2A

|  | Laminated structure (second film 36 μm/PSA/first film 36 μm) | | Transmittance (%) | YI |
|---|---|---|---|---|
|  | Second film | First film | | |
| Comparative Example 6 | Preparation Example 1 | Preparation Example 1 | 87.8 | 2.44 |
| Comparative Example 7 | Preparation Example 2 | Preparation Example 2 | 89.4 | 1.47 |
| Example 1 | Preparation Example 1 | Preparation Example 2 | 89.6 | 1.93 |
| Comparative Example 8 | Preparation Example 2 | Preparation Example 1 | 89.6 | 1.93 |
| Example 2 | Preparation Example 1 | Preparation Example 3 | 88.1 | 2.13 |
| Comparative Example 9 | Preparation Example 3 | Preparation Example 1 | 88.1 | 2.13 |

TABLE 2B

|  | Pencil hardness (500 g) | Indentation hardness (HV) (N/mm$^2$) | Elastic deformation ($H_{IT}$) (%) | Flexural property (1 mm flexural radius/200,000) |
|---|---|---|---|---|
| Comparative Example 6 | H | 53.9 | 90.9 | PASS |
| Comparative Example 7 | 2B~3B | 42.5 | 88.7 | PASS |
| Example 1 | H | 47.6 | 92.4 | PASS |
| Comparative Example 8 | <2B | 46.1 | 91.0 | PASS |
| Example 2 | F | 58.1 | 91.9 | PASS |
| Comparative Example 9 | HB | 51.4 | 90.5 | PASS |

As shown in Tables 1A, 1B, 2A, and 2B, a 80 μm thick mono-layer film (Comparative Examples 1 and 3) having a high pencil hardness fails to pass the toughness test at a flexural radius of 1 mm, but one sheet of a 36 μm thin film (Comparative Examples 2, 4, and 5) or a film prepared by laminating two sheets of a 36 μm thin films (Examples 1 and 2 and Comparative Examples 6 to 9) passes the toughness test at a flexural radius of 1 mm. That is, it is understood that the film in which two sheets of thin films are laminated to have the same thickness as a film consisting of one sheet may significantly improve the toughness compared to the one sheet of film, even if the total thickness of the whole film is the same as or similar to each other.

In cases of the pencil hardness and the indentation hardness, one sheet of the thick film having a high modulus (Comparative Example 1) has higher mechanical properties, particularly, a higher pencil hardness, but in the case of laminated film having two sheets of films that are laminated, considering the toughness, when the film having a higher tensile modulus, which is the second film, is disposed on the uppermost of the display device (Example 1) has remarkably excellent mechanical strength, particularly, much higher pencil hardness, than the opposite case that the film having a higher tensile modulus is disposed on the lower end contacted with the display panel of the display device (Comparative Example 8). The film including poly(amide-imide) copolymer having a 70 mol % of amide structural units obtained from Preparation Example 1 has superior mechanical characteristics, which is a higher tensile modulus or a higher pencil hardness, than the film including poly(amide-imide) copolymer having a 30 mol % of amide structural units obtained from Preparation Example 2.

Meanwhile, in a case of optical properties, the thinner film has better optical properties (transmittance and yellow index) than the thicker film, if the film are consisted of the same composition, and in the case of assembling two sheets of thin films further improves optical properties, particularly, a transmittance, compared to one sheet of film, if the films have the similar thickness and the same composition as each other. According to Examples 1 and 2 and Comparative Examples 6 to 9, the laminated films are manufactured by interposing a PSA adhesive between the first film and the second film. When the laminate film is obtained by interposing an adhesive layer or a hyperelastic layer between the first film and the second film, the transmittance may be deteriorated compared to the case of a film having one sheet of each of the two films without a layer therebetween. This phenomenon may be improved by not interposing the adhesive layer or the hyperelastic layer; using a different kind of the adhesive layer or the hyperelastic capable of showing improved transmittance.

Meanwhile, when the window film is manufactured by laminating two sheets of thin films, as understood from Example 1 and Comparative Example 8 and Example 2 and Comparative Example 9, the optical properties of the laminated films are the same, even if the arrangements of the films for the first film and the second film are disposed in an opposite order. But in a view of the optical properties, the total optical properties of the resulting window may be improved by adding a hard coating layer having a high optical properties on the upper end, so the entire optical properties may be further improved when the optical properties of the lower film to be disposed on a front surface of a display panel of a display device, which is the first film, is higher than the optical properties of the upper film to be disposed with the hard coating layer, which is a second film.

As described in the above, it is understood that the laminated film, including a first film to be disposed on a front surface of a display panel of a display device and a second film to be disposed on the first film, wherein a tensile modulus of the second film is greater than or equal to a tensile modulus of the first film, a transmittance of the first film is greater than or equal to a transmittance of the second film, provided that the first film and the second film are different in at least one of the tensile modulus and transmittance, may improve optical properties, and mechanical properties, as well as toughness, compared with one sheet film having a similar or same thickness and similar optical and mechanical properties.

While this disclosure has been described in connection with what is presently considered to be practical exemplary embodiments, it is to be understood that the disclosure is not limited to the present embodiments, but, on the contrary, is intended to cover various modifications and equivalent arrangements included within the spirit and scope of the appended claims.

What is claimed is:
1. A laminated film, comprising:
a first film; and
a second film disposed on the first film;
wherein a tensile modulus of the second film is greater than or equal to a tensile modulus of the first film, and
a transmittance of the first film is greater than or equal to a transmittance of the second film,
provided that at least one of the tensile modulus of the first film and the tensile modulus of the second film are not equal, or the transmittance of the first film and the transmittance of the second film are not equal, and
wherein the first film comprises a polyimide comprising a structural unit represented by Chemical Formula 1, and a poly(amide-imide) copolymer comprising a structural unit represented by Chemical Formula 1 and a structural unit represented by Chemical Formula 2, and
the second film comprises a polyimide comprising a structural unit represented by Chemical Formula 1, and a poly(amide-imide) copolymer comprising a structural unit represented by Chemical Formula 1 and a structural unit represented by Chemical Formula 2,
wherein the polyimide of the first film and the polyimide of the second film are the same or different,
wherein the poly(amide-imide) copolymer of the first film and the poly(amide-imide) copolymer of the second film are the same or different, and
the poly(amide-imide) copolymer of the first film and the poly(amide-imide) copolymer of the second film each independently comprises:
about 20 mol % to about 70 mol % of at least one structural unit represented by Chemical Formula 1 based on a total amount of structural units of the poly(amide-imide) copolymer, and
about 30 mol % to about 70 mol % of at least one structural unit represented by Chemical Formula 2 based on the total amount of structural units of the poly(amide-imide) copolymer:

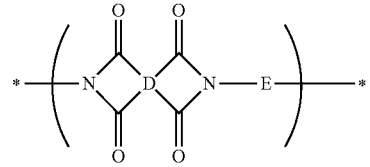

Chemical Formula 1 wherein, in Chemical Formula 1,
D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 heteroaromatic ring group, wherein the aliphatic cyclic group, the aromatic ring group, or the heteroaromatic ring group is present as a single ring, a condensed ring system comprising two or more fused rings, or two or more moieties independently selected from the single ring and the condensed ring system that are linked by a single bond, —O—, —S—, —C(=O)—, —CH(OH$_3$)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, —C(CF$_3$)(C$_6$H$_5$)—, or —C(=O)NH—,
E is a substituted or unsubstituted C1 to C30 alkylene group, a substituted or unsubstituted C2 to C30 alkenylene group, a substituted or unsubstituted C1 to C30 alkynylene group, a substituted or unsubstituted divalent C6 to C24 aliphatic cyclic group, a substituted or unsubstituted divalent C6 to C24 aromatic ring group, or a substituted or unsubstituted divalent C4 to C24 heteroaromatic ring group, wherein the aliphatic cyclic group, the aromatic ring group, or the heteroaromatic ring group is present as a single ring, a condensed ring system comprising two or more fused rings, or two or more moieties independently selected from the single ring and the condensed ring system that are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$—, —C(CF$_3$)(C$_6$H$_5$)—, or —C(=O)NH—, and 1≤n<10, 1≤p≤10, and 1≤q≤10,

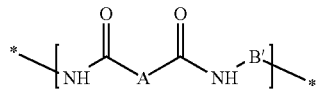

Chemical Formula 2 wherein, in Chemical Formula 2,
each of A and B' are independently a substituted or unsubstituted C1 to C30 alkylene group, a substituted or unsubstituted C2 to C30 alkenylene group, a substituted or unsubstituted C1 to C30 alkynylene group, a substituted or unsubstituted divalent C6 to C24 aliphatic cyclic group, a substituted or unsubstituted divalent C6 to C24 aromatic ring group, or a substituted or unsubstituted divalent C4 to C24 heteroaromatic ring group, wherein the aliphatic cyclic group, the aromatic ring group, or the heteroaromatic ring group is present as a single ring, a condensed ring system comprising two or more fused rings, or two or more moieties independently selected from the single ring and the condensed ring system that are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, —C(CF$_3$)(C$_6$H$_5$)—, or —C(=O)NH—, and wherein 1≤n≤10, 1≤p≤10, and 1≤q≤10.

2. The laminated film of claim 1, wherein the tensile modulus of the second film is greater than or equal to about 5 gigapascals, when measured according to an ASTM D882 standard.

3. The laminated film of claim 1, wherein the transmittance of the first film is greater than or equal to about 89%, when obtained from Y(D65).

4. The laminated film of claim 1, wherein the transmittance of the second film is greater than or equal to about 88%, when measured obtained from Y(D65).

5. The laminated film of claim 1, wherein the tensile modulus of the first film is greater than or equal to about 4 gigapascals, when measured according to an ASTM D882 standard.

6. The laminated film of claim 1, wherein a refractive index of the second film is greater than a refractive index of the first film.

7. The laminated film of claim 1, wherein the laminated film further comprises a hard coating layer disposed on the second film on a side opposite the first film.

8. The laminated film of claim 1, wherein the laminated film further comprises a back coating layer disposed on the first film on a side opposite the second film.

9. The laminated film of claim 1, wherein the laminated film further comprises an adhesive layer or a hyperelastic layer disposed between the first film and the second film.

10. The laminated film of claim 9, wherein the laminated film further comprises a second back coating layer disposed between the second film and the adhesive layer or the hyperelastic layer.

11. The laminated film of claim 9, wherein the laminated film further comprises a primer coating layer disposed between the first film and the adhesive layer or the hyperelastic layer.

12. The laminated film of claim 7, wherein the hard coating layer comprises a (meth)acrylate polymer, a polycaprolactone, a urethane-(meth)acrylate copolymer, a polyrotaxane, an epoxy resin, an organosilicon material, an inorganic hard coating material, or a combination thereof.

13. The laminated film of claim 1, wherein each of a thickness of the first film and a thickness of the second film is independently about 10 micrometers to about 100 micrometers.

14. The laminated film of claim 9, wherein a thickness of the adhesive layer or a thickness of the hyperelastic layer is less than or equal to about 50 micrometers.

15. The laminated film of claim 1, wherein the first film further comprises a polyamide, polyethylene terephthalate, polyethylene naphthalate, a polycarbonate, triacetyl cellulose, or a combination thereof.

16. The laminated film of claim 1, wherein D of Chemical Formula 1 is a moiety selected from chemical formulae of Formula Group 1:

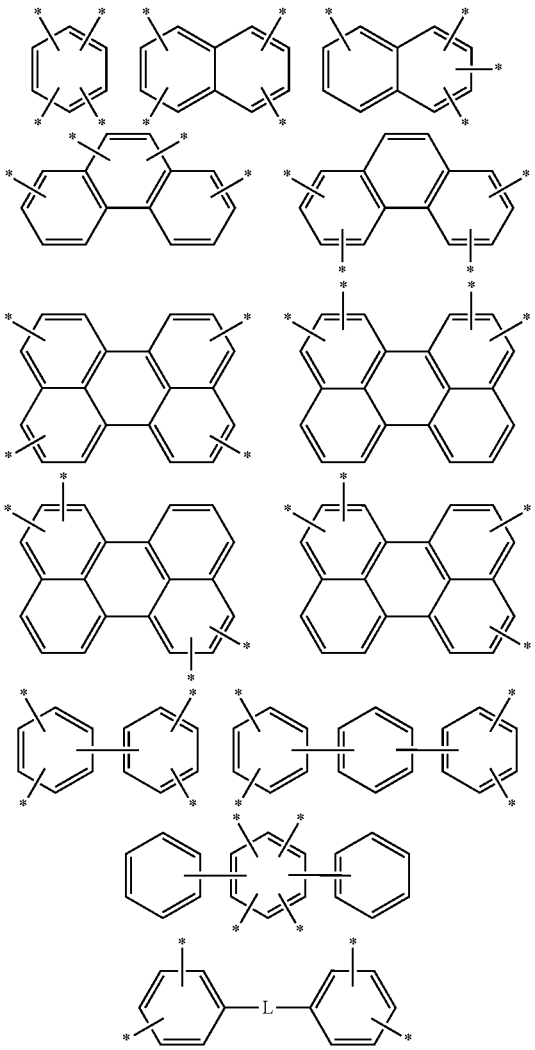

Formula Group 1

-continued

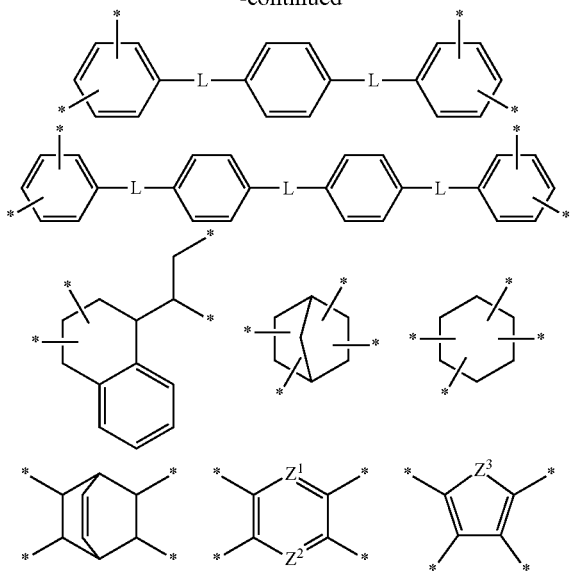

wherein, in the chemical formulae of Formula Group 1, the moiety is substituted or unsubstituted, each L is the same or different and is independently a single bond, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, —C(CF$_3$)(C$_6$H$_5$)—, or —C(=O)NH—, and wherein 1≤n≤10, 1≤p≤10, and 1≤q≤10,

* is a linking portion with an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

17. The laminated film of claim 1, wherein E of Chemical Formula 1 and B' of Chemical Formula 2 are each independently a moiety represented by Chemical Formula 5, or a substituted or unsubstituted C1 to C30 alkylene group:

Chemical Formula 5

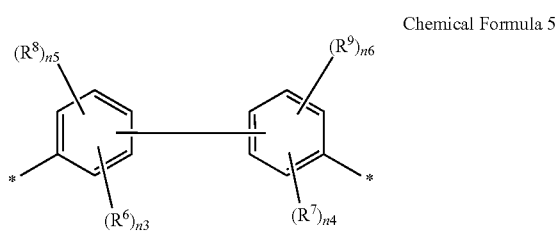

wherein, in Chemical Formula 5, each R$^6$ and R$^7$ are the same or different and are independently an electron withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$, each R$^8$ and R$^9$ are the same or different and are independently a halogen, a hydroxy group, an alkoxy group of formula —OR$^{204}$ wherein R$^{204}$ is a C1 to C10 aliphatic organic group, a silyl group of formula —SiR$^{205}$R$^{206}$R$^{207}$ wherein R$^{205}$, R$^{206}$, and R$^{207}$ are the same or different and are independently hydrogen or a C1 to C10 aliphatic organic group, a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of less than or equal to 4, and n4 is an integer ranging from 1 to 4, n6 is an integer ranging from 0 to 3, provided that n4+n6 is an integer of less than or equal to 4.

18. The laminated film of claim 1, wherein A of Chemical Formula 2 is a moiety selected from chemical formulae of Formula Group 3 or a substituted or unsubstituted C1 to C30 alkylene group:

Formula Group 3

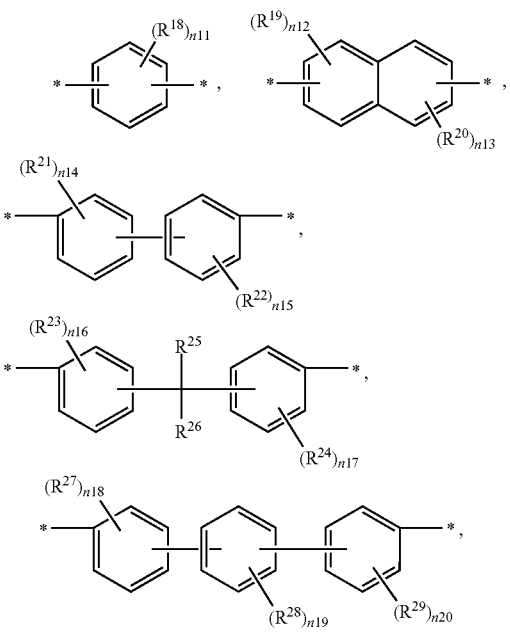

wherein, in the chemical formulae of Formula Group 3, each R$^{18}$ to R$^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, and n12 and n13 are independently an integer ranging from 0 to 3.

19. A display device comprising the laminated film of claim 1.

20. The display device of claim 19, wherein the laminated film is disposed on a front surface of a display panel of a display device, and wherein the first film of the laminated film is disposed closer to the front surface of the display panel of the display device than the second film of the laminated film.

* * * * *